(12) United States Patent
Junker et al.

(10) Patent No.: US 6,636,763 B1
(45) Date of Patent: Oct. 21, 2003

(54) BRAIN-BODY ACTUATED SYSTEM

(76) Inventors: Andrew Junker, 1350 President St., Yellow Springs, OH (US) 45387; Christian R. Berg, 1470 Clifton Rd., Xenia, OH (US) 45385

(*) Notice: Subject to any disclaimer, the term of this patent is extended or adjusted under 35 U.S.C. 154(b) by 0 days.

(21) Appl. No.: 09/857,660

(22) PCT Filed: Dec. 10, 1999

(86) PCT No.: PCT/US99/29398
§ 371 (c)(1),
(2), (4) Date: Jun. 7, 2001

(87) PCT Pub. No.: WO00/33731
PCT Pub. Date: Jun. 15, 2000

Related U.S. Application Data

(60) Provisional application No. 60/111,700, filed on Dec. 10, 1998, now abandoned.

(51) Int. Cl.[7] ................................................ A61B 5/04
(52) U.S. Cl. ................ 600/545; 600/544; 600/546; 340/825.19; 345/157; 434/112
(58) Field of Search ............................. 600/544–597; 340/825.19; 128/805

(56) References Cited

U.S. PATENT DOCUMENTS

| | | |
|---|---|---|
| 4,228,807 A | 10/1980 | Yagi et al. |
| 4,354,505 A | 10/1982 | Shiga |
| 5,474,082 A | 12/1995 | Junker |
| 5,517,021 A * | 5/1996 | Kaufman et al. ........... 250/221 |
| 5,692,517 A | 12/1997 | Junker |

\* cited by examiner

Primary Examiner—Max F. Hindenburg
Assistant Examiner—David J McCrosky
(74) Attorney, Agent, or Firm—Wood, Herron & Evans, L.L.P.

(57) ABSTRACT

An apparatus for controlling a plurality of devices in response to biopotentials produced by gestures made by a user. The apparatus includes a sensor (22) applied to the user for producing an input signal representing the biopotentials, wherein the input signal changes as a function of chances in the biopotentials. A plurality of bandpass filters (28, 30, 32) are responsive to the input signal, and each of the filters produces respective frequency signals. A processor (38) is responsive to the frequency signals from each of the filters and generates control signals in response to gestures made by the user to command operation of a device (40). A method is also provided that analyzes the high frequency signals with respect to a plurality of gesture models to detect a plurality of gestures being made by the user and then, provides control signals to a device (40) for controlling the device in response to a plurality of gestures made by the user. The method includes detecting a short eyebrow lift, a long eyebrow lift, a jaw clench, a short eyebrow drop, right and left eye glances and multiple eye blink gestures of the user. In another aspect of the invention, the method provides continuous analog control signals in response to eye gestures of the user.

8 Claims, 15 Drawing Sheets

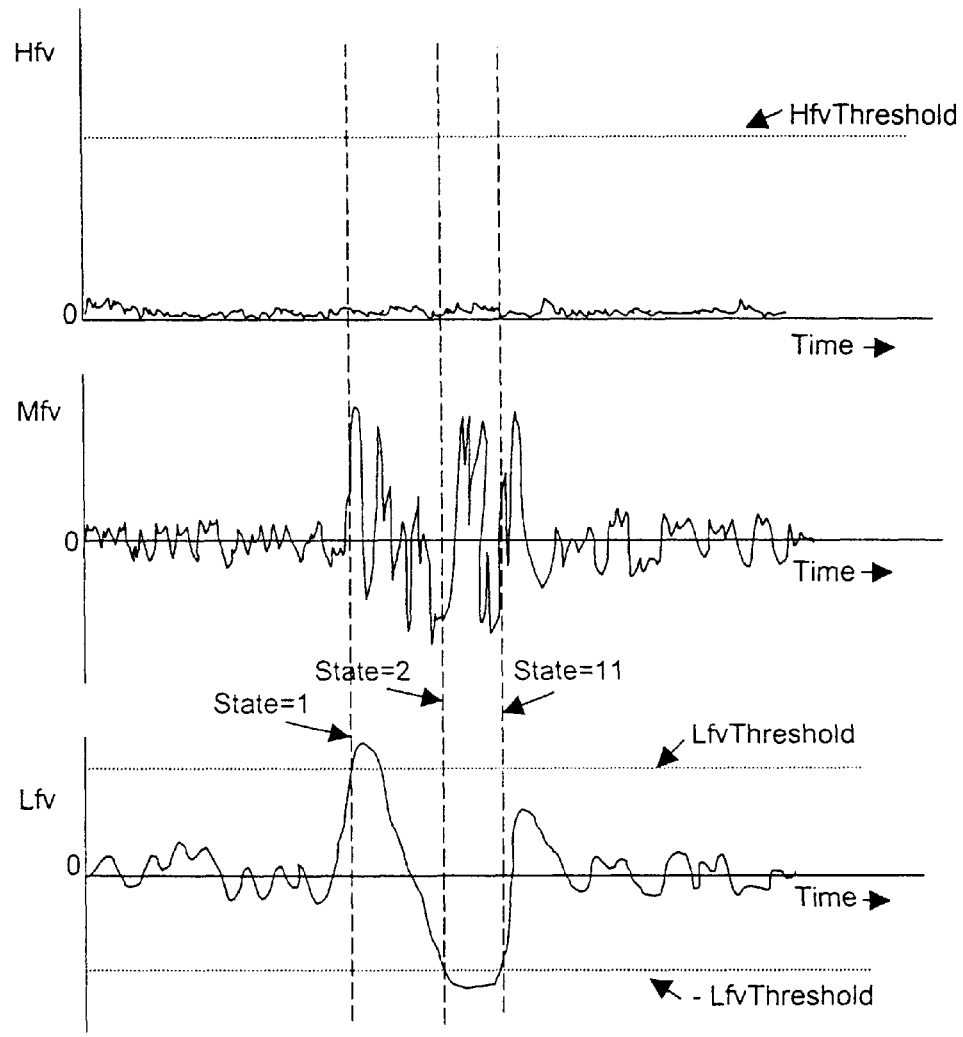
Figure: 7A

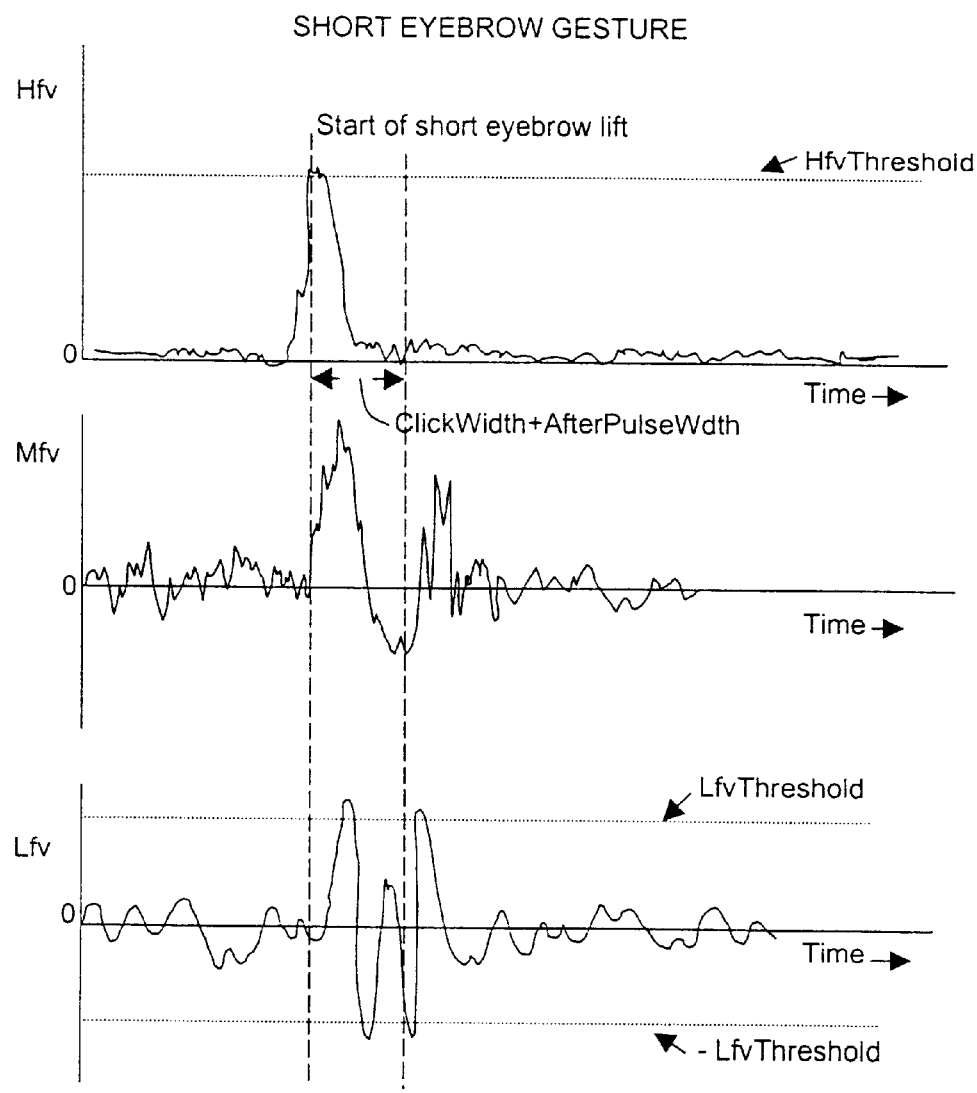
Figure: 7B

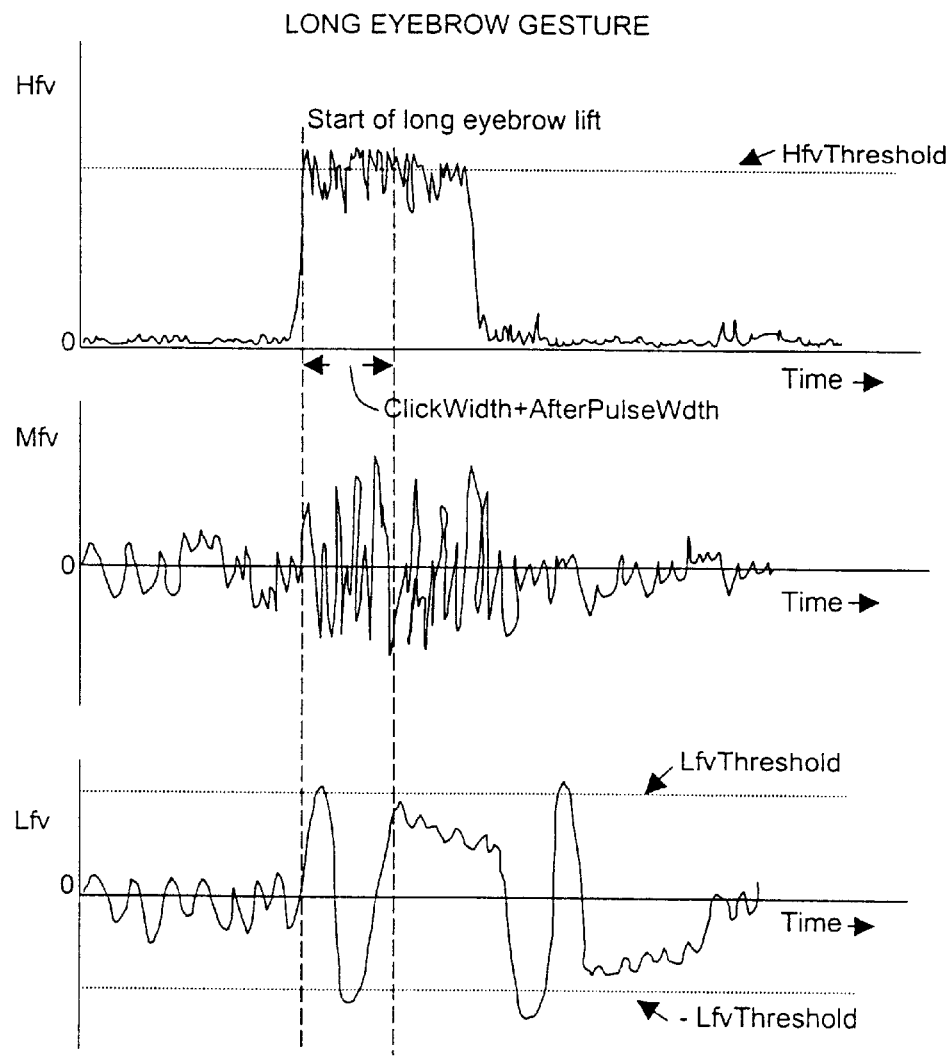
Figure: 7C

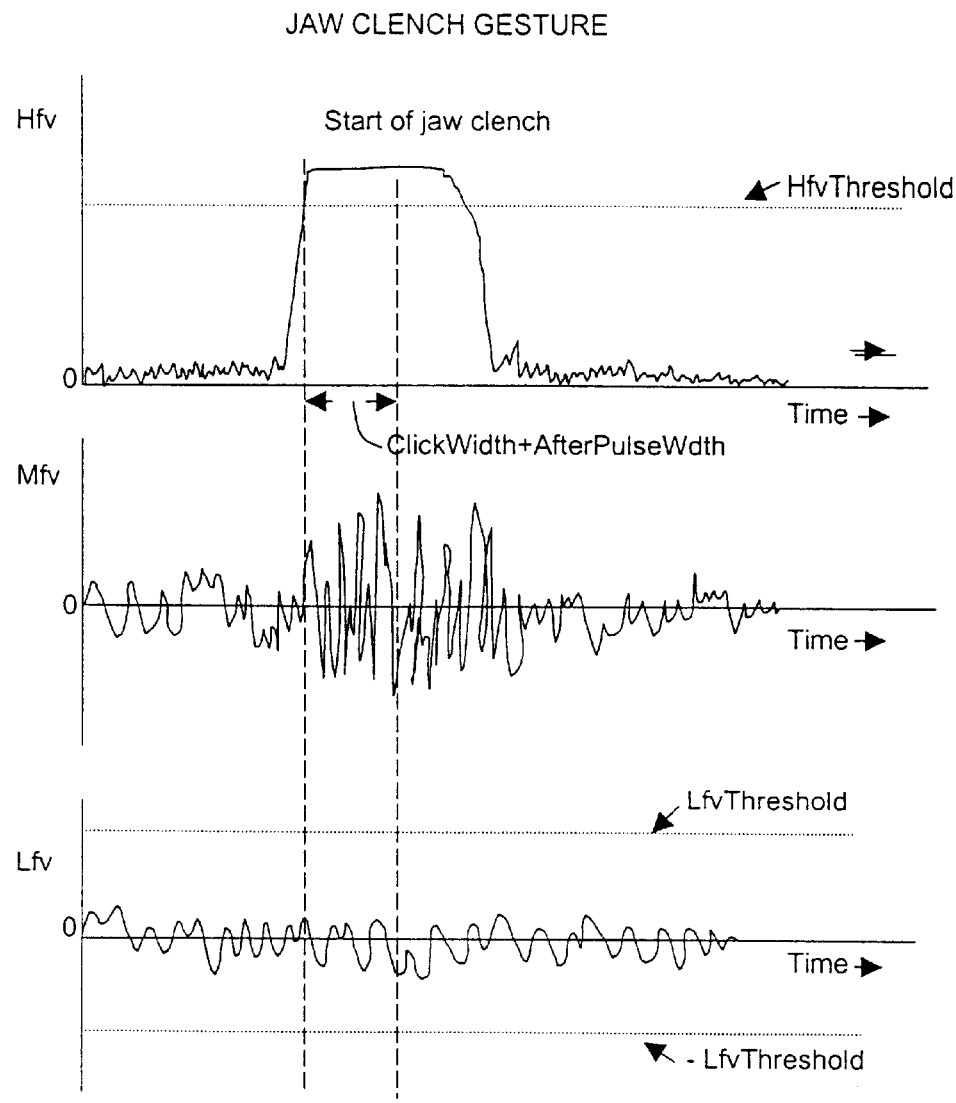
Figure: 7D

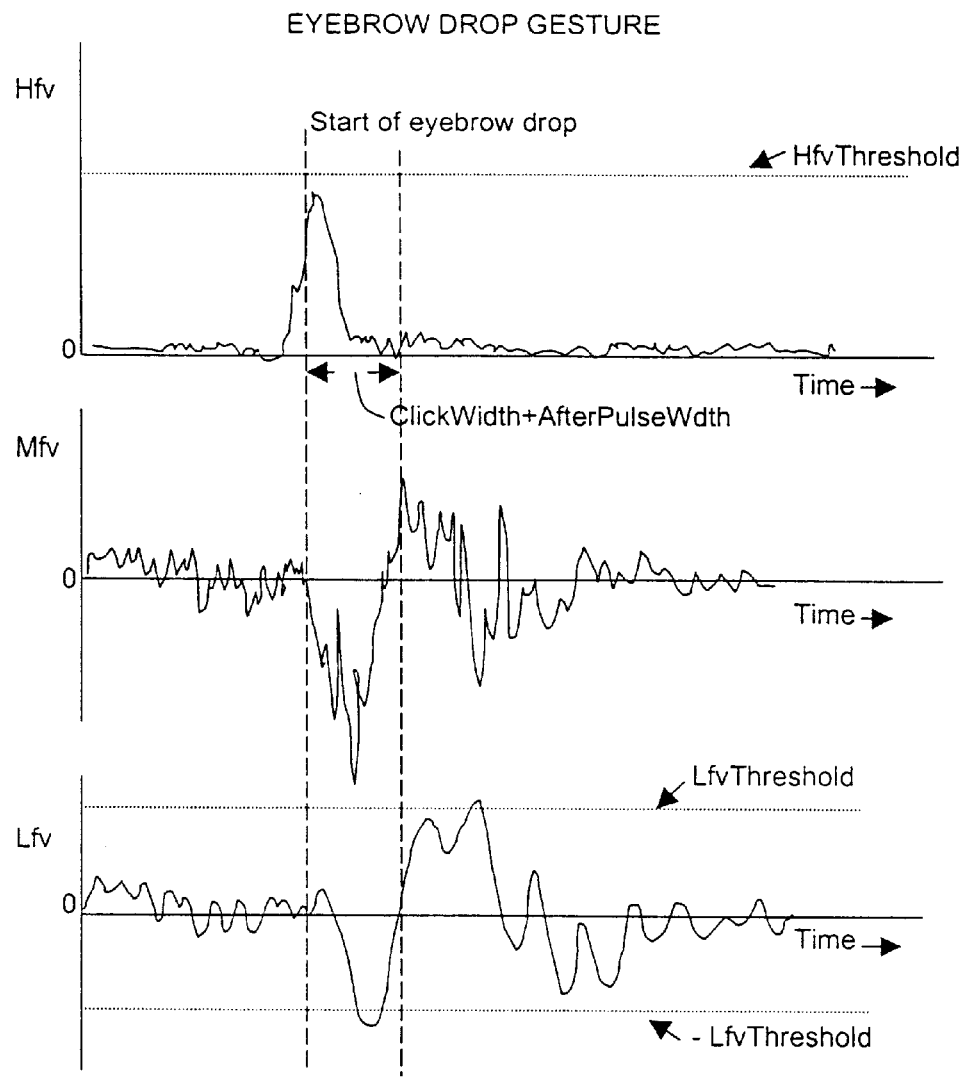
Figure: 7E

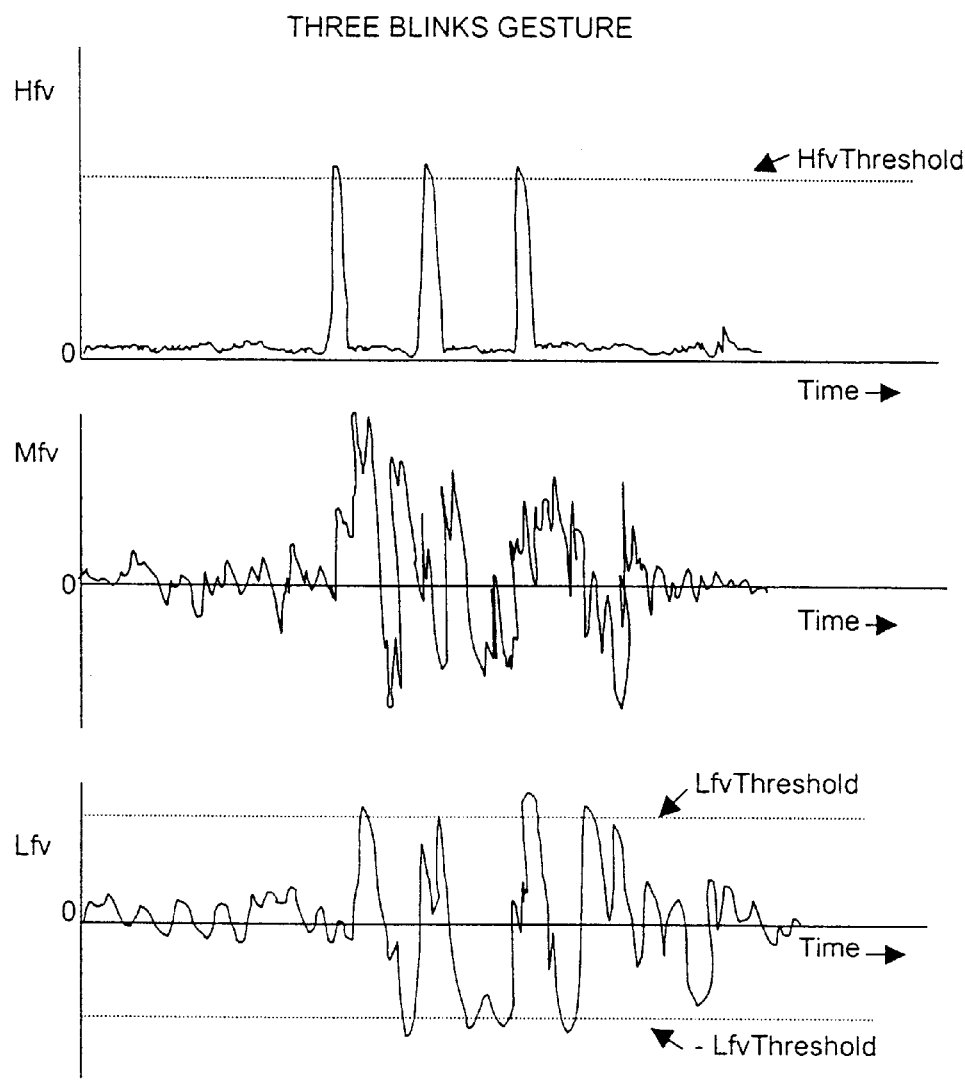
Figure: 7F

BRAIN-BODY ACTUATED SYSTEM

This application claims the benefit of Provisional application No. 60/111,700 filed Dec. 10, 1998.

FIELD OF THE INVENTION

This invention relates generally to the area of nonmanual human control of external systems. More specifically, the invention provides a control system with which a user may control an external device with control signals produced in response to a collective manifestation of electroencephalographic ("EEG"), electromyograplhic ("EM G"), electrooculargraphic and other biopotentials.

BACKGROUND OF THE INVENTION

Examples of apparatus and methods for controlling devices exclusively with brain and body biopotentials are known and described In U.S. Pat. Nos. 5,474,092 and 5,692,517. In those embodiments, a user wears a headband containing three sensors for detecting brain and body signals at the forehead. The signals are transmitted to an "interface unit" w here they are amplified, digitized and decoded to produce multiple command signals that users can learn to modulate consciously to control machines. It is possible with this system to achieve control of multiple functions.

However, the use of this approach has identified the need for additional capabilities. To make this technology more accessible and useful for a greater number and diversity of individuals, there is a need for the graphical user interface (GUI) and the requisite brain and body control skills to become more intuitive, comprehensible and easily mastered. There is a further need for new control signal channels for users with special needs and functional limitations. Further, novel methods are needed to identify, analyze, and apply new easy-to-produce signal characteristics and signal patterns for cursor control. For example, for an implementation of a hands-free mouse, methods to achieve left and right mouse button clicking, cursor speed and resolution switching, and activation and deactivation of the hands free mouse/keyboard controller are needed. In addition, methods by which the user can achieve user-adjustment of interface sensitivity, mouse-click and switch activation threshold, and cursor offset/bias; activation of alternative cursor horizontal motion control for wide field-of-view displays; and the triggering of keyboard commands such as "tab" and "enter" are also needed.

Finally, a series of training programs, including a new music program making use of complex auditory and visual biofeedback are needed to help users learn multiple discrete and continuous control signal manipulation.

SUMMARY OF THE INVENTION

The present invention provides a comprehensive, new, flexible and sophisticated control system that is heretofore unknown. The brain-body actuated control system of the present invention has the advantage of improving the efficiency and extending the capabilities of persons engaged in hands intensive activities. The brain-body actuated control system of the present invention has the further advantage of assisting and providing additional capabilities to persons having one or more mental or physical disabilities. The brain-body actuated control system of the present invention has the advantage of being relatively inexpensive and useable to provide both continuous and discrete control signals in response to detecting user gestures.

In accordance with the principles of the present invention and the described embodiments, the invention provides an apparatus for controlling a plurality of devices in response to biopotentials produced by gestures made by a user. The apparatus includes a sensor applied to the user for producing an input signal representing the biopotentials, wherein the input signal changes as a function of changes in the biopotentials. A plurality of bandpass filters are responsive to the input signal, and each of the filters produces respective frequency signals. A processor is responsive to the frequency signals from each of the filters and generates control signals in response to gestures made by the user to command operation of the plurality of devices.

In another embodiment, the invention includes a method of controlling a device in response to biopotentials produced by gestures made by a user. The method requires detecting biopotentials at a location on a user and filtering the biopotentials with a high frequency bandpass filter to produce high frequency signals in a bandwidth of from approximately 70 Hz to approximately 3000 Hz. The method analyzes the high frequency signals with respect to a plurality of gesture models to detect a plurality of gestures being made by the user and then, provides control signals to the device for controlling the device in response to a plurality of gestures made by the user.

In one aspect of the invention, the method provides discrete control signals in response to detecting a short eyebrow lift, a long eyebrow lift, a jaw clench, a short eyebrow drop, right and left eye glances and multiple eye blink gestures of the user. In another aspect of the invention, the method provides continuous analog control signals in response to eye gestures of the user.

In a further embodiment of the invention, the brain-body actuated system is linked with a music synthesizer to produce music in response to gestures made by the user.

The brain-body actuated system of the present invention is especially useful in those applications where the user's hands are already busy. For example, for those who are performing intensive text or data entry, the brain-body actuated controller of the present invention can be used to execute the functions of a mouse, thereby permitting the user to keep their hands on the keyboard. In other applications, a user's hands may be performing other tasks, for example, an assembly, manufacturing, cooking cleaning or any other task, and the brain-body actuated controller can be used to perform other functions, run appliances, etc.

Similarly, in mouse intensive applications, for example, CAD applications, the brain-body actuated controller of the present invention can be used to execute various function keys, thereby not distracting the user from the mouse activity. For those who do not wish to, or are incapable of, using their hands, the brain-body actuated controller can be used in conjunction with voice recognition systems for simplifying the voice recognition application. In addition, the brain-body actuated controller has numerous applications to assist those that have one or more mental or physical disabilities in that it allows those persons to perform functions that would otherwise be beyond their capabilities.

The above and other objects and advantages of the present invention shall be made apparent from the accompanying drawings and the description thereof.

BRIEF DESCRIPTION OF THE DRAWINGS

FIGS. 7A–7F are graphical representations of the outputs of the three frequency channels of the brain-body actuated system in response to different user gestures.

DETAILED DESCRIPTION OF THE INVENTION

Figure 1:
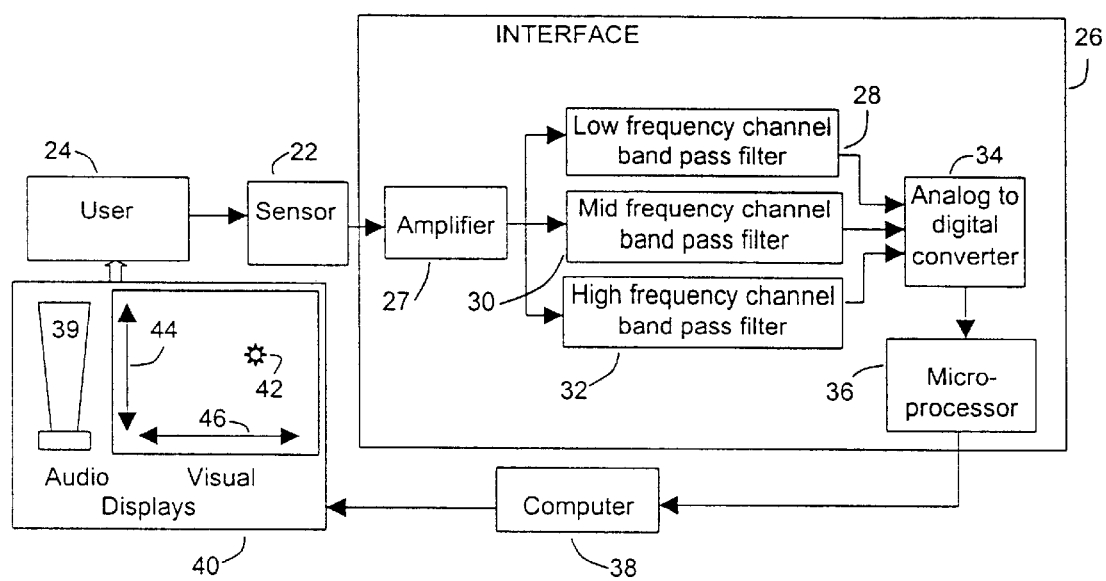
FIG. 1 is a schematic block diagram illustrating the brain-body actuated system in accordance with the principles of the current invention.

Referring to FIG. 1, as described in U.S. Pat. Nos. 5,474,082 and 5,692,517 which are hereby incorporated in their entirety herein, a brain-body actuated control system 20 receives signals from sensors, for example, electrodes, 22 in contact with the forehead of a user 24. The sensors detect a collective manifestation of electroencephalographic ("EEG"), electromyographic ("EMG"), electrooculargraphic and other biopotentials, hereinafter collectively referred to as biopotentials. The forehead is selected as the primary measurement site for the derived control signals. For users with special needs, the forehead is often the last site to suffer degradation due to injury or disease. Connection to the forehead is easy, requiring minimal skin preparation. The forehead is rich in neural and muscular enervation.

Alternate measurement sites have also been developed to increase the efficacy of our system for users with particular neuromuscular functional limitations and in certain operational settings where the forehead site is inappropriate. These sites include: 1) the right and left temple, for example, dry contact sensors mounted on the inner surfaces of the forward sections of the eyeglasses' or safety glasses' ear pieces, with the reference ground mounted on or built into the right and left nose pieces, 2) the right and left cheekbone, for example, similar eyeglass sensor mounts as temple site, with armatures or extensions off the ear pieces, same ground: and 3) behind the left and right earlobes and below the mastoids, for example, sensors mounted in rear sections of ear pieces of eyeglasses or safety glasses.

In the known control system described in U.S. Pat. Nos. 5,474,082 and 5,692,517, control signals resulting from a combination of bio-potentials for a plurality, for example, ten, control channels were derived from user selected reference frequencies residing within respective channels. In contrast, referring to FIG. 1, the combination of bio-potentials are now filtered with analog circuitry and processed in an interface circuit 26 into three separate channels defined by the range of their frequency bands.

The interface circuit 26 has an amplifier 27 that receives the signals from the electrodes 22, and the output of the amplifier 27 is divided by bandpass filters 28–32 into the three separate channels. A low frequency channel bandpass filter 28 has break points that provide a bandwidth of frequencies from proximately 0.2 Hz to approximately 3.0 Hz. A mid frequency channel bandpass filter 30 has break points that provide a bandwidth of frequencies from approximately 0.8 Hz to approximately 45.0 Hz; and a high frequency channel bandpass filter 32 has break points that provide a bandwidth of frequencies from approximately 70.0 Hz to approximately 3000 Hz. Each filter break point is achieved with a linear four pole filter network. Additionally, the high frequency channel filter 32 further includes an envelope detection circuit that rectifies the hitch frequency channel signal so that it falls within a zero to a plus power value such that the derived signal is proportional to the RMS power of the signal.

The outputs of the filters 28, 30, 32 pass through a three channel, 12 bit, A/D converter 34 and are converted from a parallel to serial signal form in the microprocessor 36. The digitized serial signal is provided to a computer or processor 38 which handles the GUI interface and decodes and processes the biopotential signal from the processor 36 to provide the desired control of the audio visual display 40. The processor 38 can be any type of processor that is capable of running the "WINDOWS 95" operating system. As will be appreciated, the A/D converter 34 can alternatively be placed to receive the output signal from the amplifier 27; and the three frequency channel bands are provided by digitizing the forehead signal and then decomposing the resulting digitized signal into various frequency bands.

The low range is predominantly sensitive to eye emotion and blinging. The mid range spans the accepted EEG frequency bands and is sensitive to a variety of facial and eye movements as well as various brain resonance such as alpha wave and beta wave generation. The high frequency range selectively responds to muscle activity such as subtle contractions of the masseter and frontalis muscles.

Brain and body biopotential signals derived from a user's forehead and other sites provide signal attributes and wave forms suitable for activating mouse left and right button clicks, for example, to move a cursor 42 in a vertical direction 44 and a horizontal direction 46 on the display 40, keyboard characters, and other computer commands and software functions. Through appropriate loop closure and multidimensional feedback, users are able to perform a repertoire of facial muscle, EEG-based and eye lance discrete actions which can be efficiently identified by state machine discrimination algorithms. These discrete actions are defined as user "gestures". Any number of gestures may be utilized to create discrete action commands for control of a device, for example, a cursor; and such discrete action command gestures are later described in detail. However, using cursor control as an example, various methods of control in response to different gestures are first described.

Two-axis Cursor Motion Formulae and Methods

The following methods were developed to improve and expand x-y axis cursor control and to extend it's efficacy to a wider diversity of individuals in a broader range of operational settings:

1—Step-velocity Cursor Motion

For both vertical and horizontal motion, cursor speed is varied with a look-up table of graduated velocities in accordance with the current magnitude of the frequency of control; and such magnitude is calculated using a moving average time window as described in U.S. Pat. Nos. 5,474,082 and 5,692,517. This approach provides a computationally economical multi-speed cursor method, practical for implementation in a mouse driver, to improve user control feedback, cursor accuracy/resolution, and interface ease of use.

2—Low Frequency Channel Horizontal Cursor Motion Method A

The cursor is programmed to move to the right as a direct function of the time-averaged magnitude of the low frequency channel. Within the low frequency resonance band, magnitude increases are sensitive to eye movements. When the low frequency channel's magnitude drops below a user-defined lower threshold, the cursor moves to the left automatically in accordance with a user-adjusted, programmed acceleration. Such a user-adjusted acceleration control is described below with respect to the Auto-Drop Bi-Polar Cursor Motion. This method improves two-axis control by fostering greater separation between x and y-axis control signal response. Eye motion and blinking create rightward cursor motion by producing increases in low frequency signal power while not significantly affecting power in higher frequency channels mapped to vertical cursor motion.

3—Low Frequency Channel Horizontal Cursor Motion Method B

Figure 2A:
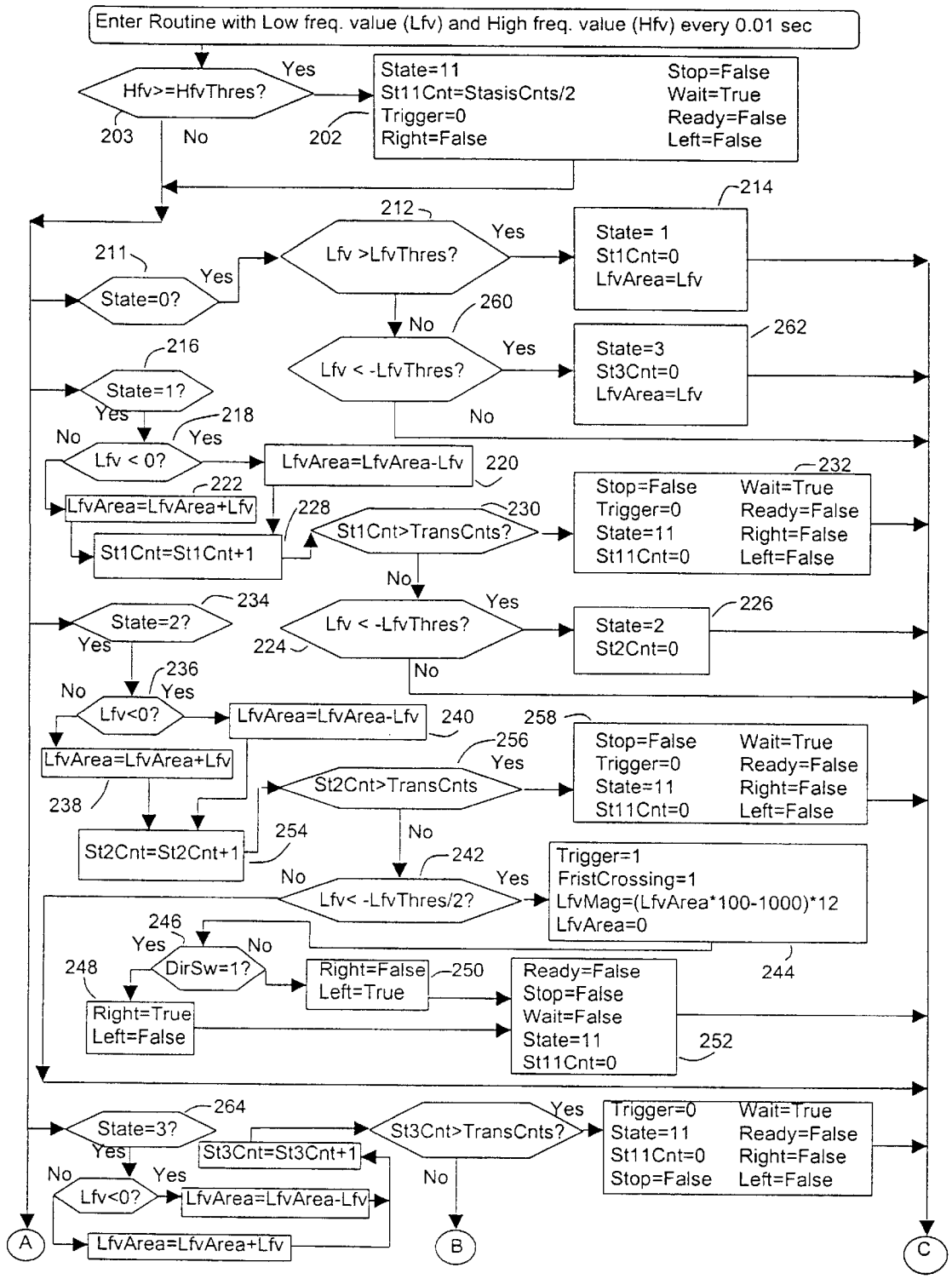
FIGS. 2A–2C is a flow chart of a routine executed by the brain-body actuated system of FIG. 1 that provides continuous analog control of a device in response to user's gestures.

This method is based on a left-right phase reversal observed in the wave form of the low frequency channel signal corresponding to direction of lateral eye motion. This method uses the shape rather than the power of the low frequency signal to determine the direction and velocity of cursor motion on the x-axis. A sharp glance to the left and then forward produces a characteristic wave form in the low frequency channel which initiates leftward cursor motion. A sharp rightward and then forward glance produces a mirror-reversed waveform, which initiates rightward cursor motion. In the described embodiment of the invention, a state machine algorithm, depicted in FIG. 2, is used to look for the presence of these two patterns to determine when a left glance or right glance has occurred and produce subsequent right or left cursor movement. The outputs of the three frequency channels in response to a look right glance are illustrated in FIG. 7A.

This algorithm cursor velocity is a direct function of the absolute magnitude of the initial peak of the low frequency left/right glance waveform. The user waits until a "ready" cue in the WINDOWS taskbar indicates the low frequency waveform has returned to a defined Ready State before further control inputs can be issued.

To increase the effective cursor speed, this method provides an alternative configuration in which a second or third glance in the same direction and immediately following the first glance causes the cursor to continue moving in the triggered direction even before the control signal returns to the Ready State.

This method also facilitates greater separation between x and y-axis response to user control inputs and is very easy to understand and intuitive to use. Due to the wave form specificity of this method, spurious or unintended horizontal cursor responses to random eye movements are inhibited, such as those that might occur in certain work environments or operational settings with wide-screen displays.

Prior to implementing the algorithm of FIG. 2, various default and user controlled settings are made and counters and switches are initialized. The user can choose to use default settings for high and low frequency value thresholds (HfvThres and LfvThres) to start with. Default values are as follows: HfvThres=0.5, LfvThres=0.4. StasisCnts (time within thresholds)=0.8 sec , and TransCnts(time to cross from one threshold to the other)=1.2 sec.

Figure 2B:
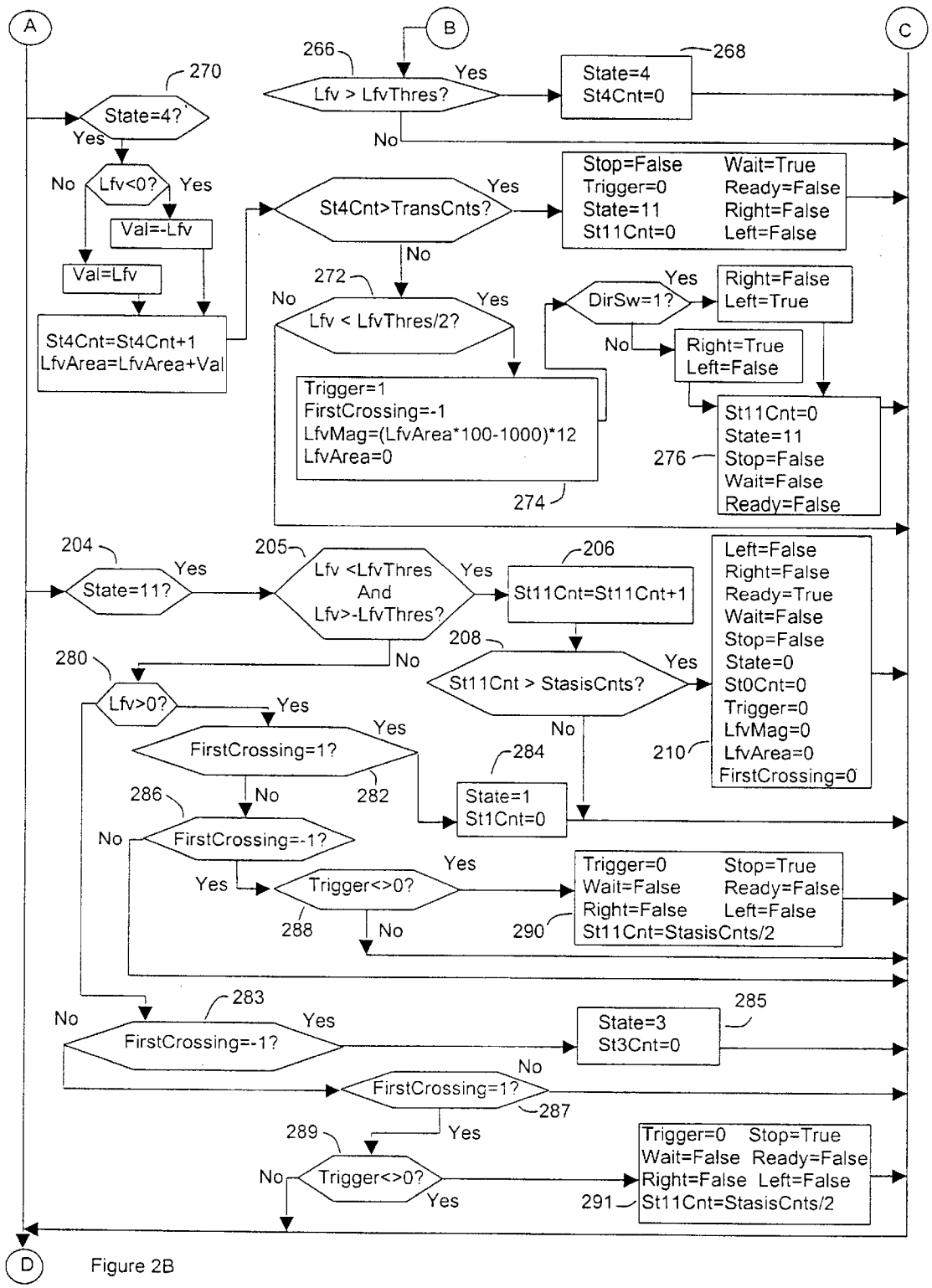
Figure 2C:
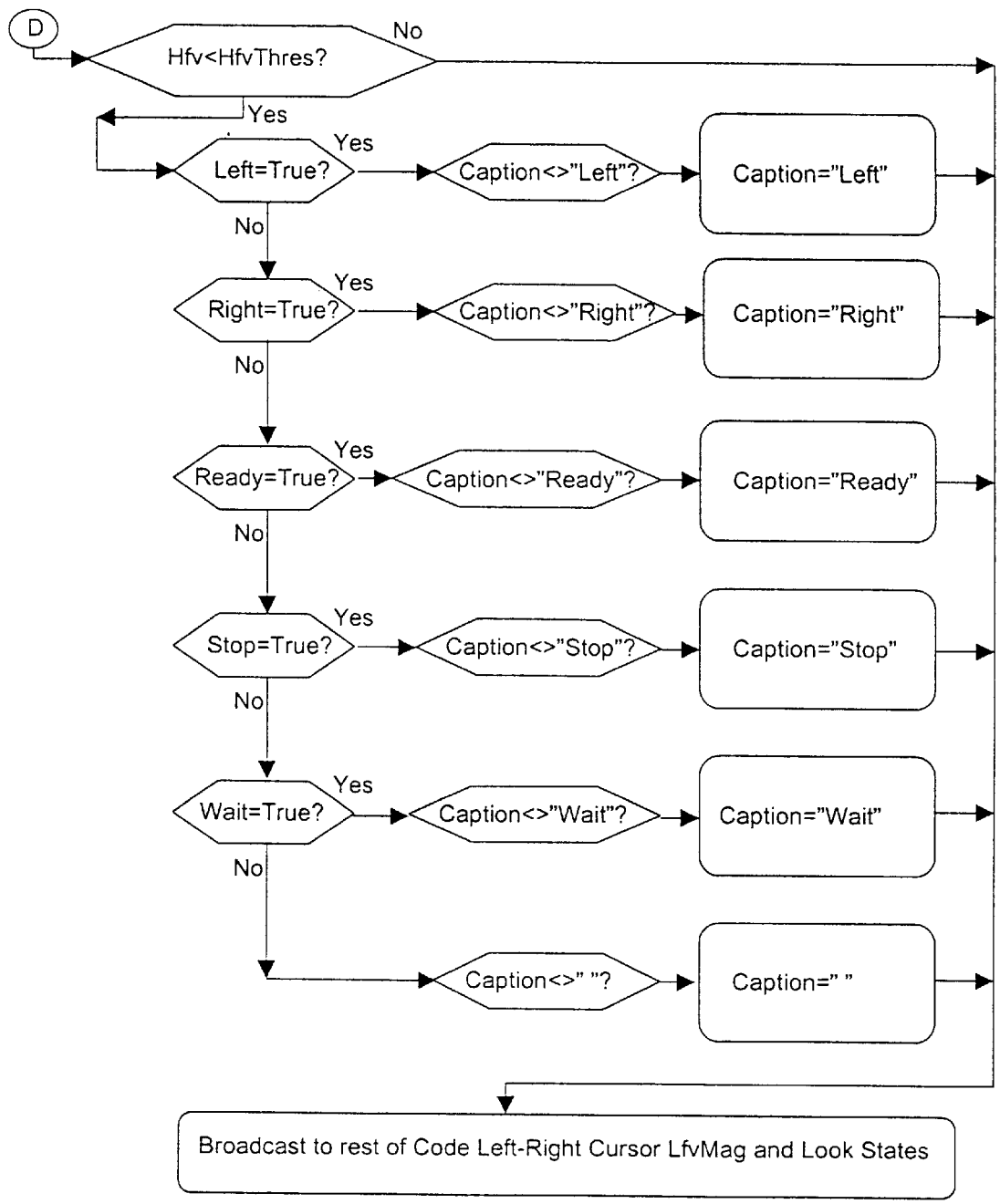

The algorithm of FIG. 2 is iterated approximately every 10 milleseconds ("ms"). The state machine is initially set to State=11: or alternatively, the state machine is set to State=11at 202 if the high frequency value is detected to be equal to or greater than the high frequency threshold at 203. The State=11 is detected at 204 of FIG. 2B. To activate a left or right gesture, the user has to first keep their Low frequency value (Lfv) within the plus and minus threshold values (205) for a count equal to StasisCnts (206, 208). Once the user maintains the Lfv at State=11 for the StasisCnt. the state machine at 210 sets the State=0 and the Ready Display and reset the other display triggers.

Upon detecting the State=0 at 211 in FIG. 2A, the state machine at 212 tests to determine if the Lfv exceeds the upper threshold. If the state machine detects a low frequency value excursion in the positive direction, the state machine at 214 switches to State=1. Upon detecting State=1 at 216, the state machine at 218, 220, 222 updates an internal accumulator of the low frequency values. If at 224, the state machine detects that the low frequency value moves below the negative threshold, the machine at 226 switches to State=2. At this point, the state machine has detected a positive excursion beyond the positive threshold and a negative excursion below the negative threshold. If a State=1 counter at 228, 230 expires before a State=2 is detected, the state machine is reinitialized at 232, thereby forcing the machine to wait for the user to bring their Lfv within the two thresholds.

State=2 is detected at 234, and the low frequency value accumulator is updated at 236–240. The state machine then at 242 detects that the low frequency value is at a threshold less than one-half the low frequency threshold indicating that the low frequency signal is moving back toward zero. A user gesture causing a large positive low frequency value, followed by a large negative low frequency that is followed by a signal moving toward zero is representative of an acceptable user command gesture. Such a command gesture may be a movement of the eyes to the right or to the left, etc. Thereafter, at 244, direction and FirstCrossing values are set. The direction value is used at 246–250 to identify the direction of motion of the detected user gesture. The identification of the gesture on the display 40 must match the user's gesture. It is possible for the identification to be the opposite; and therefore, the state machine permits the user to bring the machine display into conformance with the user's action.

The state machine at 244 also sets a FirstCrossing value= 1, calculates and stores a low frequency value magnitude and resets the low frequency value accumulator to zero. The low frequency magnitude value is broadcast to cursor movement program and is used to continue cursor motion. Then, at 252, the state machine switches back to State=11. Similarly, the state machine returns to State=11 if the low frequency value at 242 is not detected within a period of time counted by the State=2 timer at 254, 256. The state machine also, referring to FIG. 2C, sends a confirming display message to the user indicating that a proper right or left gesture (depending upon what the direction switch is set to) has been detected and that the cursor will be moved in the proper direction.

If the user initiates a gesture in the opposite direction, the negative excursion of the low frequency signal is detected at 260; and at 262, the state machine is switched to State=3. State=3 is detected at 264, a large positive excursion is detected at 266 of FIG. 2B, after which the machine is switched to State=4 at 268. State=4 is detected at 270: and at 272, a negative moving excursion is detected. Thereafter, at 274, the direction switch is set, a FirstCrossing value=−1 is set, the low frequency value magnitude is calculated, stored and provided to the cursor control program. The cursor control program is a lookup table in which the algebraic value of control signals are stored in association with desired corresponding values representing the direction and velocity of cursor motion. Interpolation between stored values may be used in a known manner. The machine is then set to State=11 at 276. The state machine also, referring to FIG. 2C, sends a confirming display message to the user indicating that a proper right or left gesture (depending upon what the direction switch is set to) has been detected and that the cursor will be moved in the proper direction.

When the state machine detects a proper left or right gesture, the FirstCrossing value is set. Then when the state machine returns to State=11, if the user initiates another gesture in the same direction, as detected at 205, 280 and determined by the value of FirstCrossing at 282, 283. In this case, at 284, 285, the appropriate state is set and the corresponding state counter is reset, thereby allowing the state machine to begin processing a potential gesture. If a gesture in the opposite direction is detected as indicated by the sign of FirstCrossing at 286, 287 and Trigger=1 at 288, 289, the state machine immediately at 290, 291, zeros LfvMag and sends a Stop message to the user. In this way, a look gesture in the opposite direction of the movement the user started will stop the cursor.

The state machine of FIG. 2 displays the various Low frequency gesture states the user creates with the display portion of the code. The continuously updated value LfvMag is sent to the code that computes left-right cursor movement.
4—Mid Frequency Channel Eye Motion Horizontal Cursor Control Careful analysis of the mid frequency channel's response to brain-body inputs shows that the lower portion of the lower frequency values of this channel are also sensitive to eye motion or glances. For example, a right eye glance causes an immediate increase in the magnitudes of any of a number of user-selected reference frequencies of the mid frequency channel ranging from 0.9 Hz to 6 Hz. To create an intuitive means of horizontal cursor control. this method generates rightward cursor velocity as a direct function of the time-averaged value of a user-selected reference frequency within the lower portions of the mid frequency channel. Using the signal processing described in the previously referenced U.S. Pat. Nos. 5,474,082 and 5,692,517, the magnitude of a control signal is used to generate rightward cursor velocity. A null amplitude about a midpoint of a magnitude from an eyes stationary state to an eves right glance state is determined by a user in a calibration or initialization process or routine. With this eye motion cursor-control, the magnitude of the control signal is sampled and subtracted from the midpoint; and the algebraic difference is used to provide a command to the cursor control program. As previously described, the cursor control program is a lookup table of command magnitudes versus cursor direction and velocity.

Consequently, with this method, the user looks to the right to move the cursor to the right. Keeping the eyes relatively stationary lowers the magnitude of the control signal below a user-defined lower threshold and the cursor moves to the left automatically in accordance with a user-adjusted, programmed acceleration.

In this method, a discrete left glance gesture, as described in paragraph 4 of Discrete Command Gestures, can be used to stop cursor motion until the state machine returns to the Ready State. This creates stability in the control interface and prevents the counterintuitive eventuality of leftward eye glances causing rightward cursor motion.

As with methods two and three, this method improves two-axis control by fostering greater separation between x and y-axis control signal responses. Rightward eye motion creates rightward cursor motion by increasing power in the lower portion of the mid frequency channel while leaving power in the high frequencies (mapped to vertical cursor motion) essentially unaffected.
5—Mid Frequency Channel Mental-based or Non-muscle Vertical Cursor Control This method uses a real-time online analysis of signal 'chaos' or time-averaged degree of variability of magnitude samples at specific reference frequencies of the mid frequency channel to initiate vertical cursor motion. A focus of attention on a perceptual cognitive task presented on the display, concentration on visual imagery or mental rotation, and listening to complex and periodic music stimuli all have been shown to evoke an increase in the variability or 'spread' of certain signals within the mid frequency channel. The signals in these channels correspond to an upper portion of the mid frequency channel as detected on the forehead/prefrontal site. These reference frequencies are at 35 Hz and/or 40 Hz.

Signal spread is defined as the variability of the sampled magnitude values over a sliding sample window which is fully described in the previously referenced U.S. Pat. Nos. 5,474,082 and 5,692,517. The cursor moves up as a direct function of increase in signal spread above a user-adjusted multiple of a baseline value and down in accordance with a user-adjusted programmed acceleration when the signal spread drops below a user-adjusted multiple of a baseline value. The baseline value is calculated individually for each user during an online signal-sampling, period in which the user is instructed by screen text and audio to "relax and think of nothing in particular."

This energy efficient method provides an intuitive vertical cursor control option that responds selectively to mental activity and offers the control method of last resort for certain users with severe neuro-muscular limitations.
6—Mid Frequency Channel Muscle-based Vertical Cursor Control This method capitalizes on the fact that certain high frequency signals within the upper portion of the mid frequency channel from approximately 12 Hz to approximately 45 Hz are sensitive to muscle activity, for example, frontalis muscle activity, that results in a slight eyebrow lift as well as brain activity. Such activity causes an increase in the magnitude of the derived lock-in signal magnitude.

For those situations in which easily learned intuitive control is desired, a high frequency reference signal of the mid frequency channel (ranging from approximately 12 Hz to approximately 25 Hz) is mapped to the up and down movement of the cursor.

Using, the signal processing described in the previously referenced U.S. Pat. Nos. 5,474,082 and 5,692,517, a control signal magnitude from the mid frequency channel is provided. The cursor attains an upward velocity as a direct function of the time-averaged magnitude of a user-selected frequency within an upper portion of the mid frequency channel. A null amplitude about a midpoint of a magnitude from an eyebrows relaxed state to an eyebrows lift state is determined by the user in a calibration or initialization process or routine. The magnitude of the control signal is sampled and subtracted from the midpoint; and the algebraic difference is used to provide a command to the cursor control program which provides the desired up or down cursor velocity. In this way, if the user raises their eyebrows, a corresponding increase in the magnitude of the derived control signal causes the cursor to move up. Relaxation of the eyebrows causes the control signal magnitude to drop below the null amplitude, thereby causing a corresponding lowering of the cursor in accordance with a user-adjusted, programmed acceleration.

This intuitive mapping of forehead muscle activity to vertical cursor movement fosters separation between x and y-axis cursor response (when the horizontal axis is controlled with one of the previously described methods) and rapid learning of two-axis control.

7—High Frequency Channel Vertical Control

Through careful analysis, it was learned that subtle contractions of the frontalis, masseter, temporalis, and other facial muscles within a certain proximity about the sensor locus, will cause biopotential signal level transients most pronounced in the high frequency channel. This signal activity is used to provide a rapid, reliable and selective method for control of the vertical axis of the two-axis cursor.

As in the method described above, using the signal processing described in the previously referenced U.S. Pat. Nos. 5,474,082 and 5,692,517, a control signal magnitude from the high frequency channel is provided. The cursor attains an upward velocity as a direct function of the time-averaged magnitude of a user-selected frequency within an upper portion of the high frequency channel. A null amplitude about a midpoint of a magnitude from a relaxed state of a gesture, for example, an eyebrow lift. to an active state of the gesture is determined by the user in a calibration or initialization process or routine. The magnitude of the control signal is sampled and subtracted from the midpoint; and the algebraic difference is used to provide a command to the cursor control program which provides the desired up or down cursor velocity. In this way, if the user makes the gesture, a corresponding increase in the magnitude of the derived control signal causes the cursor to move up. Relaxation of the gesture causes the control signal magnitude to drop below the null amplitude, thereby causing a corresponding lowering of the cursor in accordance with a user-adjusted, programmed acceleration.

In this method, upward cursor motion is generated as a direct function of the high frequency channel signal. Unintentional high frequency channel discrete command gestures (see next section) are avoided because easily controlled, very subtle, high frequency signals (well below the gesture thresholds) reliably and accurately raise the cursor. When the high frequency channel signal drops below a user-selected lower threshold, the cursor moves downward automatically in accordance with a user-adjusted, programmed acceleration.

This method creates a highly stable, easily understood, quickly mastered, and accurate cursor positioning method. When it is applied to control of the vertical axis there is virtually no corruption of, or interference with, the horizontal control signals as described above (methods two through four).

8—Radial-programmed (Polar) Cursor Motion Method

The above derived control signals (described in methods two through seven) can be used to control cursor motion in a radial, rather than a linear, vector to create a polar cursor control paradigm. In this method, the cursor follows a continuous radial motion on the display even when receiving no control inputs. At such times, when the control signal is below the lower threshold, the radius of the cursor's programmed motion is three pixels. The radius of cursor motion increases as a direct function of the time-averaged magnitude of the user-selected control signal. Cursor velocity along the radial path increases with the radius.

An alternative method increases the cursor radial velocity as a direct function of the time-averaged magnitude of a user-selected control signal suitably contrasting (in its response to brain-body inputs) to the signal used to control the radius of cursor motion.

Any screen location at which a discrete mouse click command is issued (see discrete command gestures below) becomes the new center point for the programmed radial cursor motion.

This method affords rapid acquisition of distant screen locations and targets and provides accurate and easily mastered cursor positioning in two axes for people limited by their physiology, pathology or special circumstances to a single control input.

9—Automatic Cursor Motion

An automatic cursor motion technique is employed to facilitate movement in the downward and leftward directions. As before, a null zone is defined about a midpoint of the signal magnitude by a user initialization process. In the control mode, when the user's signal value drops below the lower end of the null zone, which is centered on the midpoint, an automatic cursor motion procedure that is time based is initiated. The procedure followed to create the automatic downward or leftward movement is shown in FIG. 3 which is executed every 100 ms.

Figure 3:
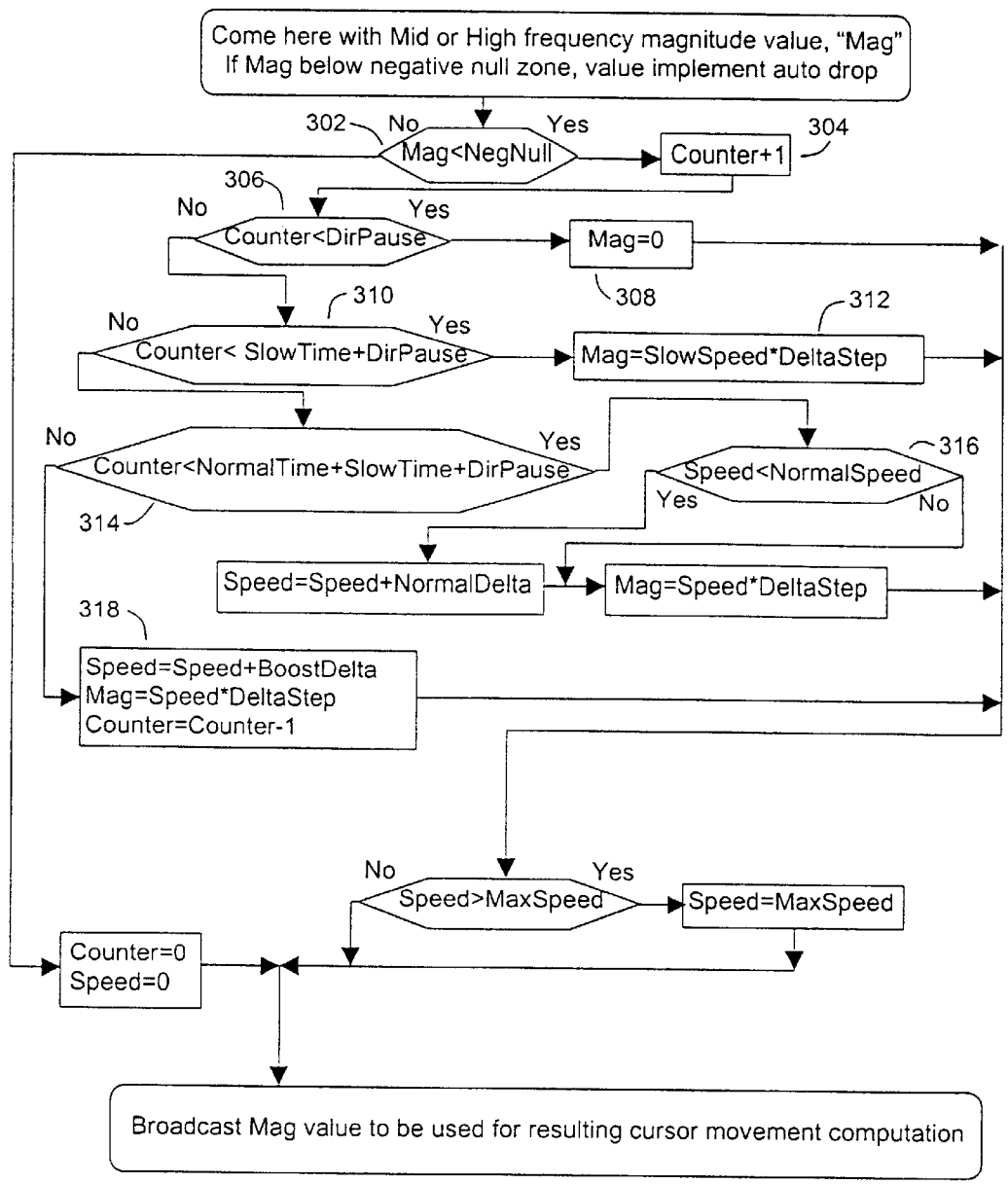
FIG. 3 is a flow chart illustrating, a routine executed by the brain-body actuated system of FIG. 1 that provides further continuous analog control of a device in response to user s gestures.

Referring to FIG. 3, prior to executing this procedure, initial values are set. The user sets their null zone (the signal range centered on the midpoint for which there is no cursor movement), and the various drop values. The following default values which are user adjustable are offered to the user to begin: DirPause=1.0 sec, SlowTime=1.0 sec. SlowSpeed=1000, NormalSpeed=4000, NormalTime=3.0 sec, and BoostDelta=8000. DirPause is the time the cursor movement is held to zero after a movement reversal from positive to negative direction. SlowTime is the time the cursor moves at a slow speed after the DirPause time. NormalTime is the time the cursor moves at a gradual increase set by NormalDelta. NormalDelta=(NormalSpeed-SlowSpeed)*1000/NormalTime. Once the cursor movement reaches NormalSpeed, the cursor movement is continuously incremented by BoostDelta until it reaches a MaxSpeed= 10,000.

As in the prior methods, using the signal processing described in the previously referenced U.S. Pat. Nos. 5,474, 082 and 5,692,517, a control signal magnitude is produced from an output of either the mid or high frequency control channels. A null amplitude about a midpoint of a magnitude from a relaxed state to an active state is determined by the user in a calibration or initialization process or routine. The null amplitude is defined by negative and positive limits about a zero valued midpoint. Referring to FIG. 3, as long as the control signal magnitude value is below the negative null limit at 302, the auto drop routine proceeds to work through the auto drop sequence implementing the use-created drop times and drop speeds. Further, the time that the magnitude value is below the negative null value is measured by incrementing a counter at 304. Next at 306, the counter value is tested with respect to DirPause time; and if it is less, a pseudo ma value is set to zero at 308 and sent to the cursor control program to command a zero cursor velocity.

If the counter value is greater than the DirPause time, it is then compared to the SlowTime at 310; and if it is greater than the DirPause time, the pseudo magnitude is set to a slow speed value at 312 and sent to the cursor control program. A command signal is selected from the lookup table causing the cursor to move slowly in the downward direction. In a similar manner at 314, 316, the counter value is tested to determined whether the cursor value should be set to a normal cursor speed. If the counter value is sufficiently large, a command will be generated at 318 to move the cursor at a high speed.

Discrete Command Gestures
High Frequency Channel Gestures

In the high frequency channel, five facial muscle-based gestures are used to create discrete action commands: 1) a short, concise raising of the eyebrows (short eyebrow lift), 2) a longer eyebrow lift with a greater minimum duration (long eyebrow lift), 3) a short, concise, lowering of the eyebrows (short eyebrow drop), 4) a clenching or closing of the jaw (jaw clench), and 5) three rapid consecutive intentional blinks (three blinks). Each of these discrete gestures can be differentiated from the others by a pattern-recognizing algorithm and thus mapped to separate mouse, keyboard, or other input commands and functions.

1—The Short Eyebrow Lift

This gesture is created when the user rapidly and concisely lifts their eyebrows. As illustrated in FIG. 7B, this action of the frontalis creates a characteristic voltage spike in the high frequency channel of the user's brain-body signal when measured at the forehead site. Users can create this waveform reliably and quickly (Nelson et al., 1996). There are a number of ways in which this waveform can be evaluated to determine if it is an actual short eyebrow lift gesture.

Figure 4:
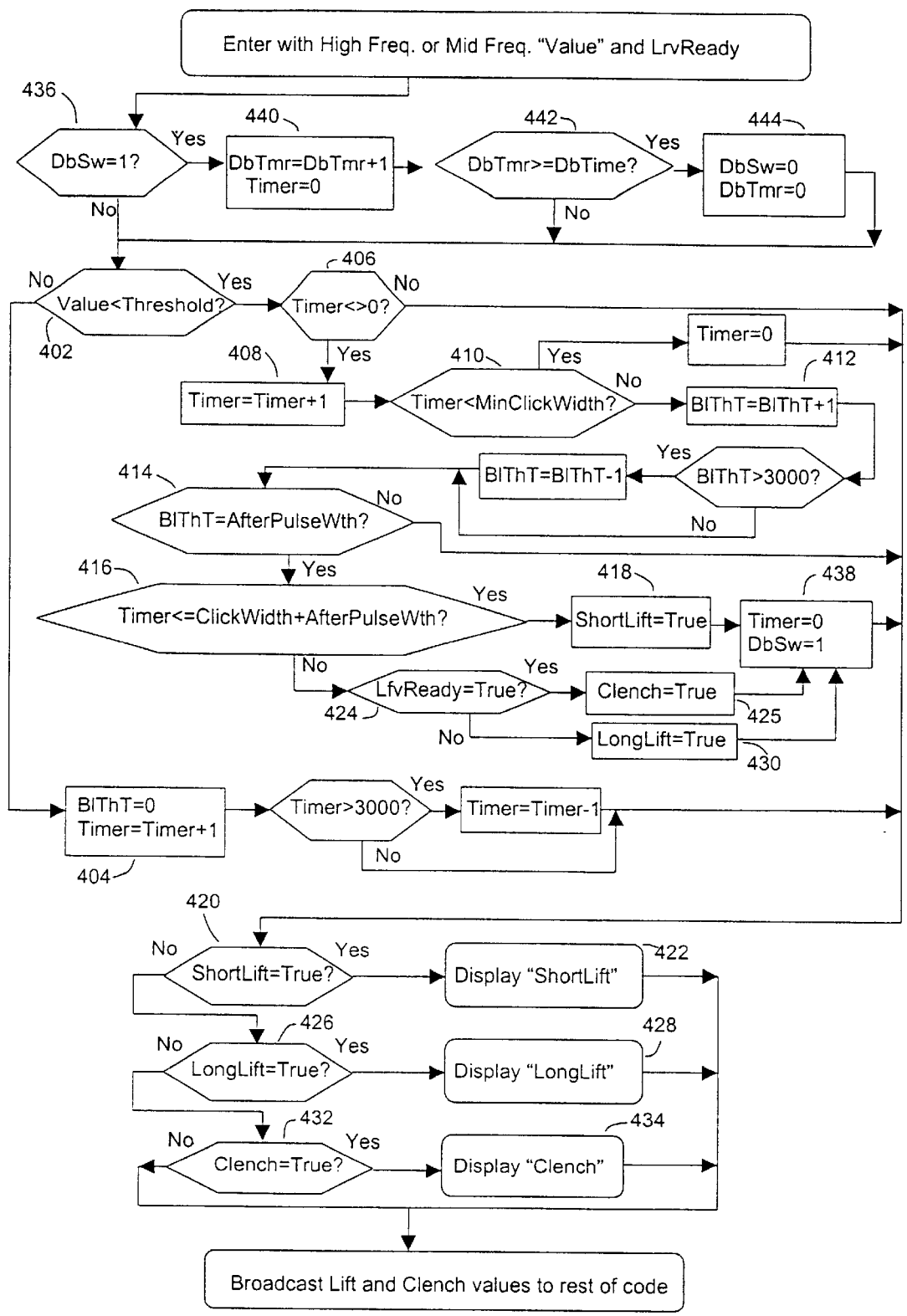
FIG. 4 is a flow chart of a subroutine executed by the brain-body actuated system of FIG. 1 that provides discrete control signals in response to user gestures.

In the described embodiment, the derived high frequency channel power signal is evaluated with a state machine illustrated in FIG. 4. The state machine at 402 compares the signal value to threshold. When the signal exceeds the threshold, a threshold timer called Timer is started at 404; and with each 10 ms iteration through the program, the Timer measures the time that the value remains above the threshold When the magnitude of the high frequency magnitude value drops below the threshold, the state machine determines that the Timer is running at 406 and then increments the Timer at 408. Thereafter, at 410, a minimum click width is checked. The minimum click width defaults to zero, but the user may select a width value or time as required by the user. Thereafter, a below threshold timer called B1ThT is started at 412. At 414, the below threshold timer is tested with respect to an after pulse width time. If the below threshold timer is equal to the after pulse width time at 414 and the Timer is equal to or less than the click width plus the after pulse time at 416, a pulse high frequency waveform is registered as a short eyebrow lift gesture at 418. Then, at 420, 422, a short eyebrow lift is displayed to the user to confirm that the computer has recognized that gesture.

If, during an iteration, the signal goes above the threshold as detected at 402, before the below threshold timer reaches or exceeds the after pulse width, then at 404, the Timer continues and the below threshold timer is reset. The following, default values are provided to the user to start: Threshold=0.5, MinClickWidth=0, AfterPulseWth=0.12 sec, and ClickWidth=0.3 sec. The threshold levels, derived signal sensitivity, maximum pulse width, and after pulse width are all user-adjustable.

If at 416, it is detected that the signal went above the threshold value and then down after a time that is greater than click width plus the after pulse width, that is, the maximum pulse width, then one of two gestures are being made, that is, a long eyebrow lift or a jaw clench. A more comprehensive discussion of these two gestures is contained in paragraphs 2 and 3 below. Further, it has been determined that a long eyebrow lift is also reflected in the low frequency channel. If the long eyebrow lift is being made, as shown in FIG. 7C, the low frequency channel will be in some state other than a relaxed or Ready State; and therefore, the low frequency value ready signal state of FIG. 2 will be false. The jaw clench has no impact on the low frequency analysis as shown in FIG. 7D; and therefore, with that gesture, referring to FIG. 2 at 210, the low frequency value ready signal state will be true. In FIG. 4, at 424, a test of the low frequency ready signal is made. If it is true, the low frequency signal is within the positive and negative thresholds; and therefore, the high frequency gesture is identified as a jaw clench at 425. A jaw clench is identified to the user at 426, 428. Similarly, if low frequency ready signal is false, the long eyebrow lift gesture is identified at 430; and a long eyebrow lift is identified to the user at 432, 434.

FIG. 4 also includes a debounce function if activated by the user. A debounce switch is initially defaulted to, and detected as, zero at 436. When a gesture is identified at 418, 425, 430, the timer is set to zero and the debounce switch is set to one at 438. Thereafter, with each iteration, the debounce timer is incremented at 440; and the timer is compared to the user selected debounce time at 442. When the debounce time expires, the debounce switch is reset to zero at 444. Thus, the debounce process is effective to ignore unwanted repeated discrete actions or gestures that are unique to a particular user.

The short eyebrow lift is easily learned and natural to execute. To facilitate this learning process, a graphical display showing the time history of the high frequency channel signal superimposed over the threshold level is provided. In this way, the user is able to monitor their eyebrow lift action relative to the threshold. By working with the display, the user is able to adjust the threshold level and sensitivity of the high frequency channel signal by increasing or decreasing the amount of eyebrow lift effort required to produce a software-recognized short eyebrow lift gesture. It should be noted that such threshold and sensitivity adjustments can be utilized with all of the gestures as well as the different modes of two-axis control.

If the user has excessive ambient or spasmodic muscle activity in the high frequency band, they are able to set the threshold value above this ambient "noise". This is accomplished by adding an offset to the user's signal, which has the effect of lowering the signal relative to the threshold. This has been found to be necessary for users with Multiple Sclerosis and Cerebral Palsy, for example. The user is also provided with the capability to manually trigger a computer-simulated short eyebrow lift gesture waveform. The form of this simulated gesture is determined by the user-adjusted threshold, maximum pulse width and after pulse width. This graphical image provides the user with a target pulse shape that must be achieved for successful triggering of a short eyebrow lift gesture. The user then trains to achieve this shape and/or adjusts the state machine settings so that the pulse shape they desire to produce is acceptable by the computer as a short eyebrow lift gesture. It should be noted that such an adjustment can be utilized with all of the gestures as well as the different modes of two-axis control.

2—The Long Eyebrow Lift

This gesture is created when the user lifts their eyebrows, holds them in an elevated position for a time greater than the maximum pulse width, and then lowers them. As illustrated in FIG. 7C, this action of the frontalis creates a characteristic series and pattern of pulses in the high frequency, mid frequency and low frequency channels of the user's brain-body signal when measured at the forehead site. Users can learn to create this waveform reliably and quickly.

The state machine algorithm can look for a characteristic series of peaks, troughs and plateaus in the mid frequency channel time history wave form and a coincident change in the low frequency channel and a coincident signature plateau in the high frequency channel time history. In the described embodiment. the state machine uses the low frequency channel information of FIG. 2 and the high frequency channel information of FIG. 4.

3—The Jaw Clench

This gesture is produced when the user contracts or clenches their jaw muscles. As illustrated in FIG. 7D, this action of the jaw contraction produces a very large transient in the high frequency channel of their brain-body signal as measured at all the sites of measurement discussed above. The jaw clench waveform has similar attributes to the short eyebrow lift waveform. It produces a pulse or a series of pulses that can be actuated to exceed a predefined threshold level. A key difference between the short eyebrow lift and jaw clench gestures is that the eyebrow lift gesture can normally be executed quickly, sometimes as fast as 0.02 seconds. The jaw clench gesture is typically longer in duration, normally around 0.8 seconds.

4—The Short Eyebrow Drop

This gesture is created by a rapid and concise lowering of the eyebrows or the action of drawing the eyebrows together. As illustrated in FIG. 7E, this generates a unique combination of waveforms in the high and mid frequency channels, which are detected by a state machine discrimination algorithm. This algorithm looks for a high frequency pulse which is similar to, but slightly smaller than, the voltage spike defining a short eyebrow lift gesture and a concurrent peak in the mid frequency signal, which is phase reversed from the mid frequency trough typically accompanying the short eyebrow lift.

5—The Three Blinks

Referring to FIG. 7F, this gesture of three rapid, consecutive volitional blinks creates a unique pattern of three evenly spaced small pulses in the high frequency channel time history which is discriminated by a simple state machine algorithm.

Mid Frequency Channel Gestures

6—The Brainfinger Gesture

This gesture is created from a user-selected, derived reference frequency in the mid frequency channel and triggers a discrete gesture command when its magnitude exceeds and then falls below a user-adjustable threshold. This method provides the alternative of a non-muscle-based discrete command gesture for users with severely limited facial muscle functionality. The same state machine as used for the detection of high frequency gestures in FIG. 4 is used for detection of a Brainfinger gesture. User threshold, signal sensitivity, and pulse width adjustments are made as with the high frequency gestures described above.

Low Frequency Channel Gestures

7—The Left Glance and Right Glance

These gestures of swiftly glancing to the left and then back forward create a unique pattern in the low frequency channel which is discriminated by a state machine algorithm and is defined as a left glance gesture. The action of swiftly glancing to the right and then back forward creates a unique pattern in the low frequency channel, called a right glance gesture, which is phase reversed from the left glance gesture pattern. The two gestures are discriminated by the same state machine algorithm, which is shown in FIG. 5 and which is similar to the state machine of FIG. 2. The same initial values and counters that are used for the Left-Right-Look Cursor Control State Machine of FIG. 2 are used in FIG. 5.

Figure 5A:
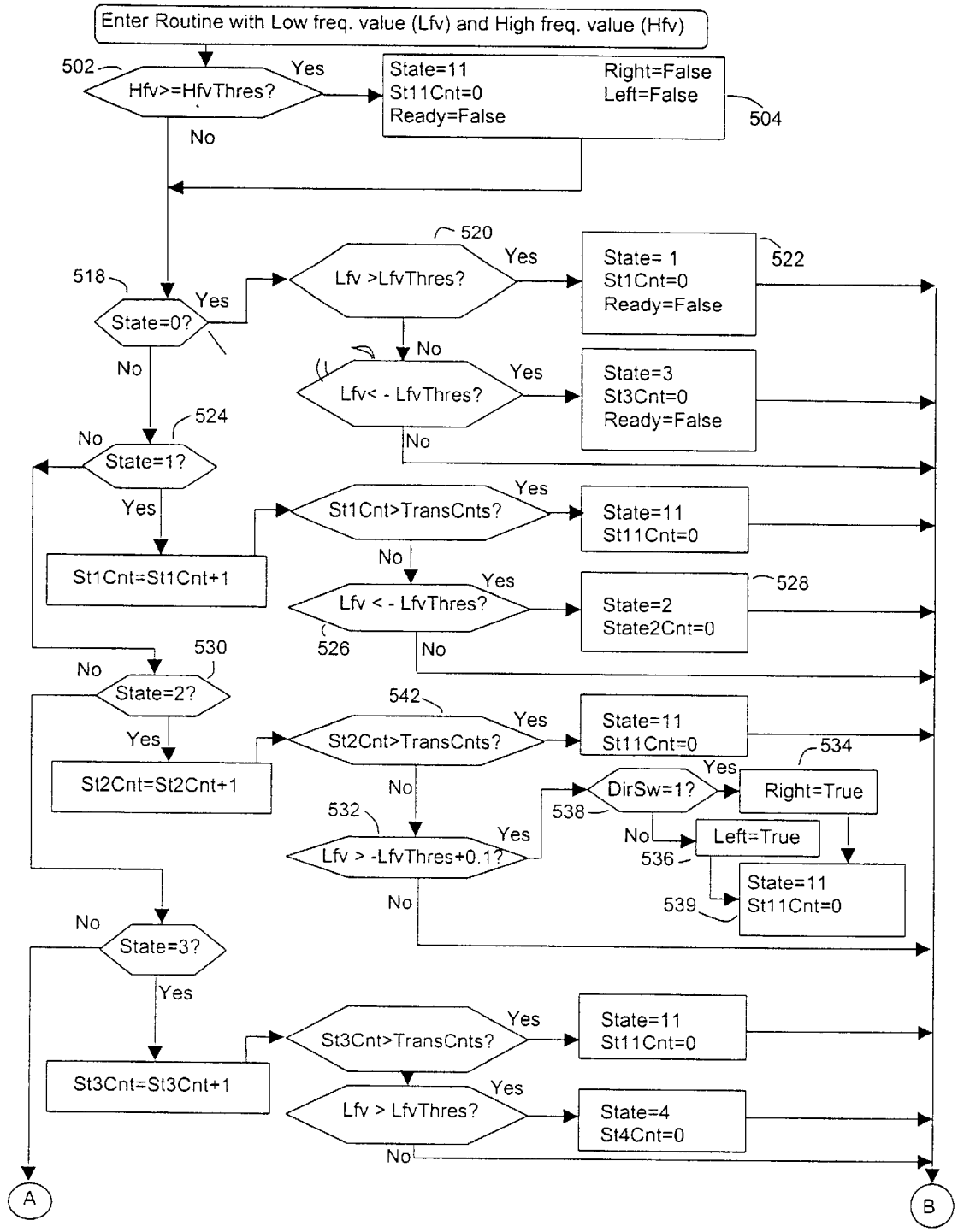
FIGS. 5A and 5B is a flow chart of a routine executed by the brain-body system of FIG. 1 that provides further discrete control signals in response to user gestures.
Figure 5B:
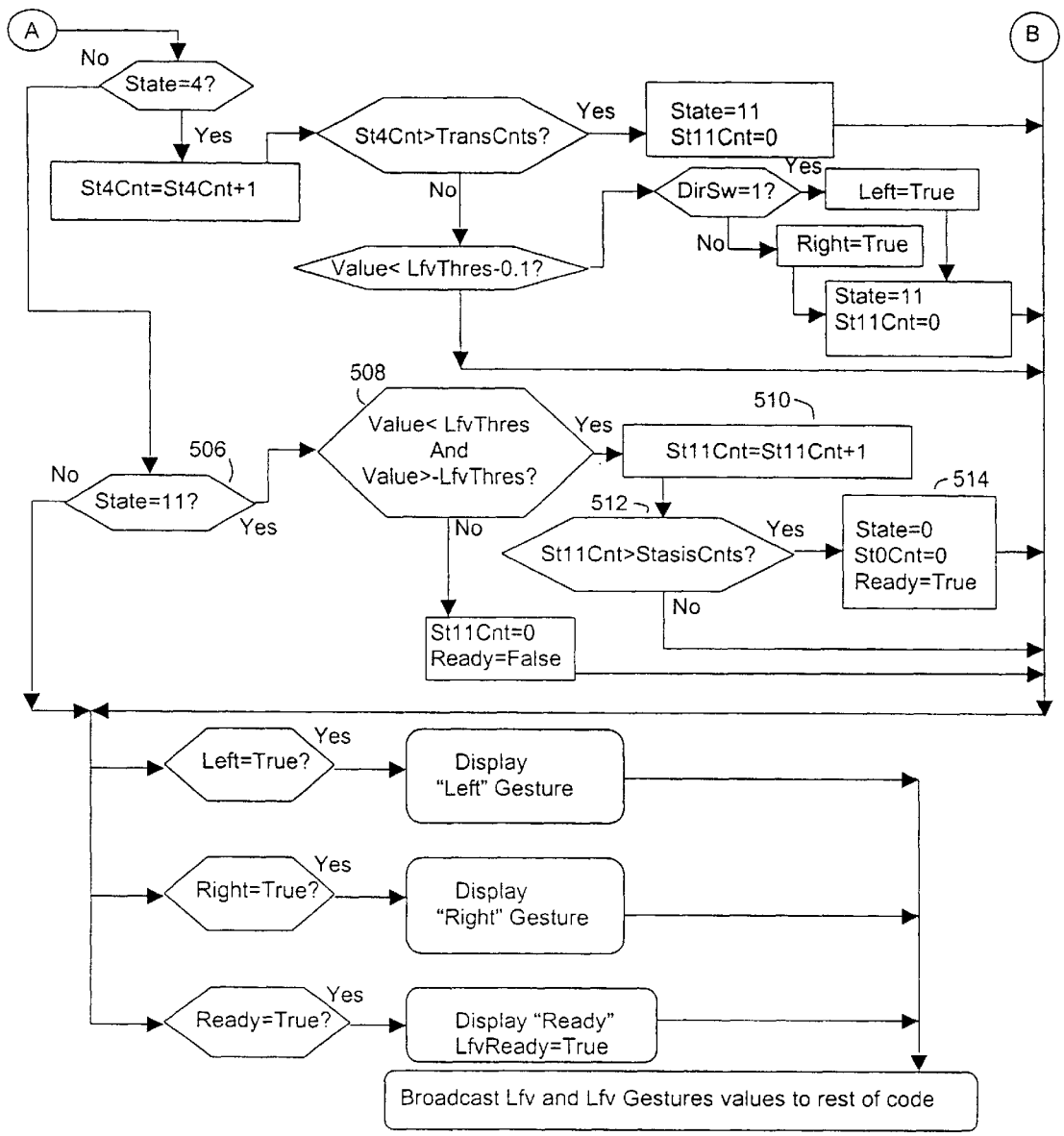

Referring to FIG. 5A, the state machine first tests at 502 whether there is high frequency signal activity that exceeds the high frequency threshold. If activity is detected, the state machine at 504 is set to the wait state of State=11 and the St11Cnt counter is forced to zero. With each successive 10 ms iteration, the State=11 is detected at 506 of FIG. 5B; and at 508, the state machine detects if low frequency value stays within the positive and negative thresholds. The State=11 counter is incremented at 510 and its count is compared to the stasis count value at 512. When the stasis count value is reached, the State=0 is set at 514.

Once in State=0 as detected at 518 of FIG. 5A, the state machine activates a search for any right/left glance waveforms in the signal. While in the Ready State, if the signal first exceeds the positive threshold at 520, the state machine will move into State=1 at 522. State=1 is detected at 524; and at 526, the state machine determines if the low frequency signal then reverses and exceeds the negative threshold. If so, the state machine moves into State=2 at 528. State=2 is detected at 530; and the state machine detects at 532 if the low frequency value reverses again and moves to a value=−LfvThres+0.1. That is, has the low frequency value reversed; and if so, a gesture is identified at 534, 536 in accordance with the state of the direction switch at 538. Thereafter, the state machine is returned to State=11 at 539. This must occur within the appropriate transition time (TransCnts) as detected at 542 for the state machine to register that a right or left glance (depending upon the setting of DirSw) has been detected. Likewise, if from the Ready State, the state machine detects at 544 that the low frequency signal crosses the negative threshold, the state machine moves through State=3 and State=4 in a manner similar to that previously described.

The polarity of the low frequency signal is a function of the electrode placement relative to the generated biopotentials. Therefore, the user is given the ability to reverse the polarity of the presented low frequency signal to insure their right or left glance action correctly matches their intended cursor direction command. This is saved as the variable DirSw. The user is also given the ability to set the levels of the positive and negative signal thresholds, the low frequency signal sensitivity, and the state machine left/right glance discrimination timings (TransCnts and StasisCnts). Presenting a continuously running time history display of the low frequency channel signal with the two thresholds superimposed over it, facilitates the training of the look gestures. Computer-simulated left and right glance waveforms are provided to give the user visual targets to emulate for successful left/right glance generation.

To make the eye glance detection state machine more robust, coincident activity in mid and high frequency channels can be monitored as well. In the described embodiment, if the high frequency energy (Hfv) goes beyond a threshold level (HfvThres), it is interpreted as an indication that some forehead activity other than a simple eye glance has occurred. For example, an eyebrow lift can produce a similar waveform in the low frequency channel but it concurrently produces a spike in the other two channels as well. If this occurs, the state machine resets and waits in State=11 for the signal to return to a Ready State. The user is provided with this information (i.e. eyebrow lift cues) during training so that they can know what it 'feels like' to be in and out of the Ready State.

All the above discrete command gestures, when initiated by the user, are accompanied by visual cues in the WINDOWS taskbar. The visual cues can be user-formatted as either text or pictographs of faces performing the appropriate gesture. Auditor WAV file gesture cues in the form of various short, easily identified bell-like musical tones are also provided.

Gestures and Cursor Motion

In this approach, all the discrete gesture commands described above arrest cursor motion for a brief user-adjustable interval of time (typically one second) regardless of any concurrent x or y-axis cursor positioning control inputs the user may be intentionally or unintentionally sending. This creates predictable and stable cursor response. When users initiate discrete gestures to make selections or send keyboard characters or other command inputs, the cursor remains over the selected icon, button, or other active area of the display. This method also facilitates greater control accuracy because gesture commands can be used to stop the cursor immediately upon acquisition of intended targets.

Mapping of Discrete Command Gestures

In use, the discrete command gestures are employed to provide full left and right mouse-button click and click-and-drag functionality, enhance the intuitive control of the computer or machine interface, and to improve the pointing accuracy of the cursor control. In the described embodiment, the short eyebrow lift gesture provides a quick, easy and reliable left mouse button click command. When it is executed, the two-axis cursor ceases all motion for a user-adjustable interval (typically one second), a left mouse button command is sent to the computer's operating system, and a "left click" cue appears in the WINDOWS desktop task bar. If a double left mouse button click is required, the user simply performs a second short eyebrow lift gesture within a user-adjusted time limit after the first click gesture command. Click-and-drag commands can be sent to the operating system by executing a third short eyebrow lift gesture in a similar manner. For tasks requiring extensive click and drag operations, the mapping of a jaw clench, for example, is mapped to a click and drag command.

In cases where frontalis functionality is limited or absent, or where forehead command action is inappropriate, the Brainfinger gesture, jaw clench, or eye right/left glance gestures can be user-formatted to produce the mouse button clicks.

The combination of a left glance gesture followed by a jaw clench gesture can be user-formatted to trigger the system in and out of "sleep mode". Sleep mode is defined as the state in which cursor movement inputs and discrete command gestures do nothing to alter the behavior of the system other than the toggling of sleep mode off. The discrete gestures can also be formatted individually to generate keyboard ASCII character commands and character strings, i.e., a "Tab" character command when the user looks right and an "Alt-Tab" string when the user looks left.

The ability to toggle between different mappings of forehead signal magnitudes to cursor x and y speeds can be accomplished with jaw clench gestures and eyebrow drop gestures. In a typical configuration, toggling between high cursor speed and low cursor speed is accomplished with the jaw clench gesture. The low speed provides a high resolution at the expense of speed and the high speed provides a fast moving cursor at the expense of accuracy. The eyebrow drop gesture is used to step down the high speed incrementally with each eyebrow drop gesture.

Because each application may require unique mapping of discrete gestures to computer or machine action, the invention is set up so that the user and/or the application can specify the desired gesture-mapping configuration.

The above brain-body actuated system provides a number of both discrete and continuous control signals in response to gestures of the user, thereby providing a comprehensive, new, flexible and sophisticated control system that is heretofore unknown. Such a control system is especially useful in those applications where the user's hands are already busy. For example, for those who are performing intensive text or data entry, the brain-body actuated controller of the present invention can be used to execute the functions of a mouse, thereby permitting the user to keep their hands on the keyboard. In other applications, a user's hands may be performing other tasks, for example, an assembly, manufacturing, cooking, cleaning or any other task; and the brain-body actuated controller can be used to perform other functions, run appliances, etc.

Similarly, in mouse intensive applications, for example, CAD applications, the brain-body actuated controller of the present invention can be used execute various function keys, thereby not distracting the user from the mouse activity. For those who do not wish to or are incapable of using their hands, the brain-body actuated controller can be used in conjunction with voice recognition systems for simplifying the voice recognition application.

The brain-body actuated controller has numerous applications to assist those that have one or more mental or physical disabilities in that it allows those persons to perform functions that would otherwise be beyond their capabilities.

Three Channel, Multi-signal Brain-body Actuated Music Program for Training of Multiple Discrete and Continuous Control Signal Manipulation To foster user understanding of, and a sense of causal connection to, multiple discrete and continuous control signals, a new brain-body driven musical synthesis program is used. The same signal acquisition, power analysis, and wave form discrimination methods as described above and in the previously cited U.S. Pat. Nos. 5,474,082 and 5,692,517 are used. This method employs complex multi-layered auditory and visual biofeedback to reward harmonic coherence, volitional patterns, and/or periodicity in various user-selected, derived reference frequency bands of the mid frequency channel with consonant, dynamic and/or pleasing music accompaniment. Incoherent signals, or a bio-spectral pattern lacking in energy in the beta, and/or gamma bands, are negatively reinforced with an inert or otherwise uninteresting musical accompaniment.

Figure 6:
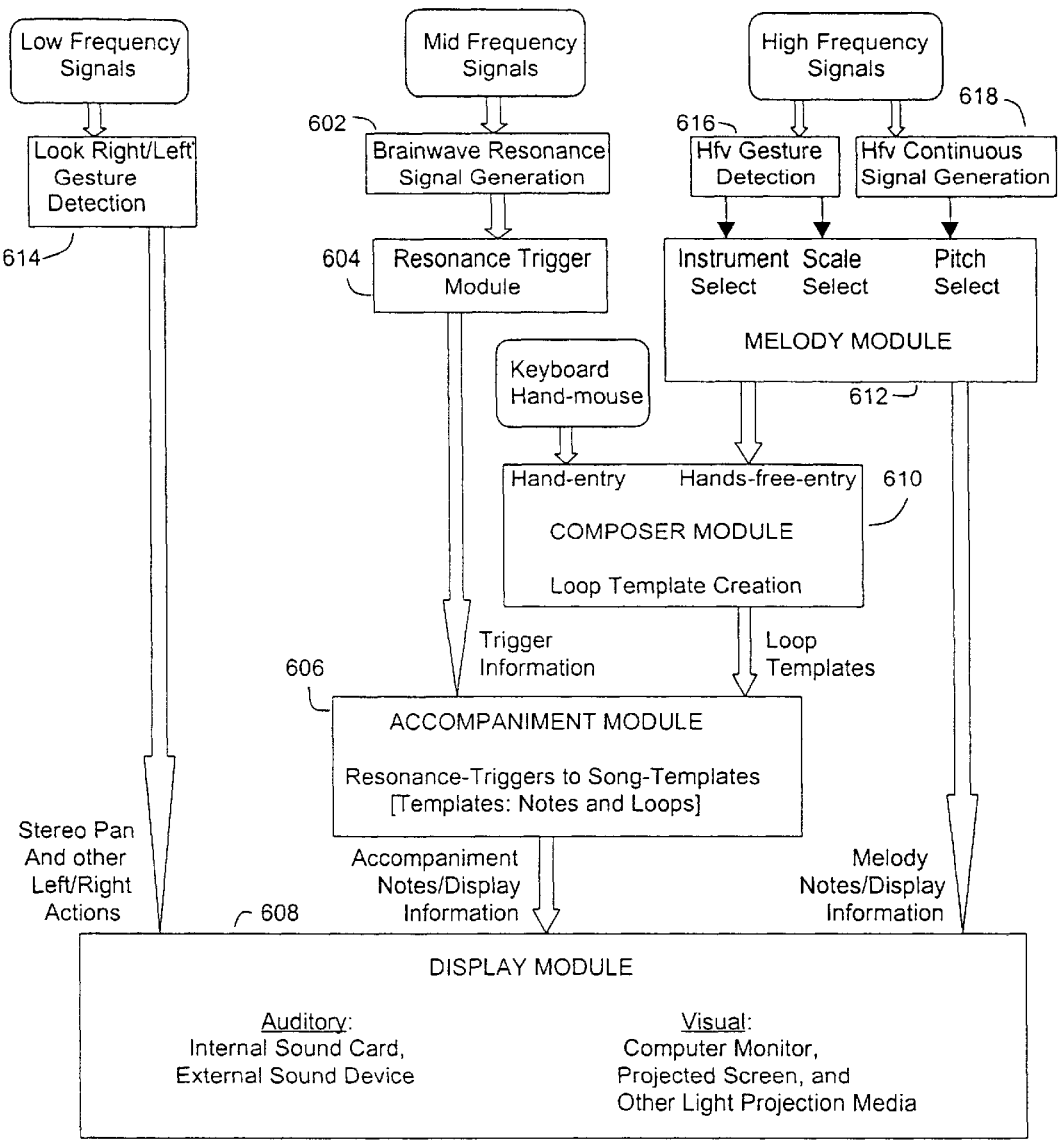
FIG. 6 is a schematic block diagram of a music synthesizing system responsive to user gestures in accordance with the principles of the present invention.

A schematic diagram of the music synthesis program is illustrated in FIG. 6. In the music synthesis program, the mid frequency signals of the bio-spectral analysis software are used to calculate time-averaged magnitudes of an array of user-selected mid frequency channel reference frequencies ranging from approximately 7 Hz to approximately 45 Hz. This is done in the brain resonance signal generation module 602. In the described embodiment, user-selectable reference frequencies are restricted to a certain repertoire of values. Values that when transposed up by five octaves (multiplied by 32) into a range that is more audible to the human ear, can be selected to correspond to frequencies of musical notes of the Western Chromatic Scale (i.e., A, A#, B, C, C#, D, D#, etc.). These are defined as "brainwave resonance frequencies." The time-averaged magnitudes at the user-selected brainwave resonance frequencies are compared to user-adjusted threshold levels called "trigger points" in a resonance trigger module 604. The trigger points for each selected brainwave resonance can be set individually.

Values of the average signal magnitude values and trigger status are sent to the accompaniment module 606 in which corresponding user defined son, templates are activated according to the information received. When any selected brainwave resonance's average magnitude exceeds its trigger point, it is activated. The accompaniment module 606 then sends musical commands, for example, MIDI commands, to display module 608 that includes the PC computer's sound card or an external sound module corresponding to the transposed 'pitch' of the brainwave resonance (i.e., a beta, brainwave resonance of 13.75 Hz generates the note "A" which is 440 Hz or 5 octaves above). Alternatively, a short repeating sequence of pitches centered around the pitch corresponding to the brainwave resonance frequency, called a "loop," (i.e. the musical phrase: "A, B, A, G, A, A, A") can be triggered. A loop will continue to play (be activated) as long as its corresponding brainwave resonance frequency exceeds its trigger point.

User-selection of the brainwave resonance frequencies to be used for triggering musical events, the corresponding musical pitches and loops to be triggered, as well as user-formatting of the notes comprising the loops is accomplished in the composer module 610. This can be done in one of three ways. In one method, the compose module 610 presents a selection of possible musical pitches and "loop presets" (short musical phrases, of progressive complexity, centered around a primary musical note corresponding to a selected brainwave resonance frequency) displayed on a musical Grand Staff. The Grand Staff's appearance and functionality is in the manner of current standard music notation software programs such as Finale™ or Cakewalk™. The user then chooses from among these alternatives to setup the musical material to be activated for each selected brainwave resonance frequency. In this way, a custom "song template" is created.

The second method uses the compose module's Grand Staff display to provide the user a means to mouse-click individual musical pitches and pitch values (in the manner of current standard music writing software programs) to construct custom loops for brainwave resonance triggering The third method involves a loop "record" module in which the user employs their high frequency channel derived RIMS signal power to affect the vertical motion of a selection-cursor along a vertical scale incremented with the notes of the Western Chromatic Scale (displayed in Standard Musical Notation) through the melody module 612. By modulating their high frequency channel signal, the user can cause the cursor to "dwell" or remain in a stationary position at desired pitch levels for a user-defined minimum selection time interval ("dwell-time"). In this way, the user can construct each loop to be used in the song template by selecting each component loop pitch in a hands-free manner. The duration of each loop to be 'recorded' or formatted in this way is user-defined. After 'recording' each loop, the user is given the opportunity to accept or reject it as part of their overall constructed song template.

The instrumentation (program assignment or voice) for each brainwave resonance frequency can be separately formatted by the user with a pictographic musical instrument selection graphical user interface. The mouse click is used to increment the musical instrument pictograph (and corresponding instrument) forward through each selection on the instrument menu. In the described embodiment; brass, reeds, percussion, upper strings, lower strings, bass, guitar, piano, flute, vocal, bells, harp, ambient pads, and sound effects instruments are all provided in the instrument menu.

Any number of different song templates can be produced. Once a song template has been created, it can be selected from a play menu. As the music program plays the brain-body activated audio output; a visual display consisting of a virtual keyboard is sent to the PC computer video. The virtual keyboard emulates an overhead view of a piano keyboard. As brain resonance frequencies exceed their trigger points, the corresponding musical notes (transposed up five octaves) are highlighted on the virtual keyboard.

In addition, a kaleidoscopic pattern called a "mandala" is sent to the PC video display 608. The mandala pattern 'paints' color-coded diamond shapes in a radial symmetric, recursive pattern in accordance with the brainwave resonance frequencies currently exceeding their trigger points. The diamond's color is determined by the brainwave resonance frequency: the lower frequency brainwave resonance frequencies are color-coded red, the low-middle: yellow, the middle: green, the high: blue and the highest: violet (in the manner of the familiar "roygbv" of the visual light spectrum). Thus, the red diamonds begin to appear on the display when their corresponding red brain resonance frequency has exceeded its activation threshold. They appear at a radius corresponding to the current magnitude of the corresponding triggered brainwave resonance frequency. They 'linger' in the mandala pattern for a brief timed interval after the triggering brainwave resonance has dropped below its threshold. The size of the diamond is incremented in accordance with the user-selected magnitude level of the trigger point of the corresponding brain resonance frequency.

An improvised melodic line can be superimposed over the mid frequency channel brainwave resonance accompaniment during the playing of a song template through the melody module 612. The method is similar to the method for hands-free loop formatting ('recording') described above. The high frequency channel derived RMS signal power drives the melody module 612 by raising and lowering a selection-cursor and thus the pitch level or increment of a vertical musical scale. The musical scale is displayed in Standard Musical Notation and is user-selected from a menu of major, minor, and pentatonic scales and modes. In the described embodiment, the pentatonic (five-note) scale is employed due to its harmonic compatibility with a wide range of harmonic accompaniments and key centers.

Typically, user's can raise the melody pitch incrementally with subtle eyebrow lifts or gentle pressure of the tongue against the roof of the mouth. The melody pitch is lowered upon relaxation. Increasing tongue pressure on the roof of the mouth is a technique familiar to instrumentalists such as flautists and trumpeters who use it to raise the pitch of their instruments.

Low frequency and high frequency channel discrete gestures can be user-formatted as command inputs to crease real-time changes in various parameters of the melody and accompaniment such as melodic scale transposition, stereo pan, musical instrumentation changes, and other musical effects.

A left glance gesture, as described herein, can be used to send a left pan command of one increment to the display module to create a stereo pan effect. A right glance gesture can be used to pan one increment back to the right. A jaw clench gesture can be used to transpose the melodic scale of the melody module 612 up a user-formatted interval. This discrete high frequency channel gesture can be used to create larger interval skips and leaps in the continuous high frequency derived RMS power generated melodic line. A short eyebrow lift can be used to switch the program assignment (instrumentation) of the melody module to a new instrumentation value 612.

Thus, the musical synthesis program as described provides a new way to create and play music using new controls derived from gestures of the user. Such a music synthesis program has been found to be very pleasant and relaxing to the user. Further, such a program is useful in music therapy in that it envelopes the user with auditory and visual displays that provide a compelling experience of self discovery.

While the present invention has been illustrated by a description of various embodiments, and while these embodiments have been described in considerable detail, it is not the intention of Applicants to restrict or in any way limit the scope of the appended claims to such detail. Additional advantages and modifications will readily appear to those skilled in the art. For example, in the described embodiments, the detection and identification of gestures of a user from a filtered composite biopotential signal is used to control different devices such as a mouse and keys of a computer and a music synthesizer. As will be appreciated, the present invention may be used to control other devices such as switches on appliances, communications equipment and other devices in residential, business or manufacturing environments and on vehicles of all types.

In the described embodiment, the brain-body actuated system includes three bandpass filters. As will be appreciated, depending on the application, all three of the filters may not be required. For example, if only discrete control signals are required as are produced by the algorithm of FIG. 3, then only a high frequency filter is necessary. Further, the low mid and high filters have bandwidths that have been determined to be particularly effective. However, as will be appreciated, other bandwidths may be used, and the brain-body actuated system will still detect gestures as described herein. While the limits of the bandwidths are susceptible to variations that are an order of magnitude different from those recited, they may be varied by a factor of two or three and still be operable.

Thus, the invention in its broader aspects is not limited to the specific details, representative apparatus and method, and illustrative example shown and described. Accordingly, departures may be made from such details without departing from the spirit or scope of Applicants general inventive concept.

What is claimed is:

1. A method of controlling motion of a cursor in a display of a computer in response to biopotentials produced by gestures made by a user comprising:

detecting biopotentials at a location on a user;

filtering the biopotentials with a low frequency bandpass filter to produce low frequency signals in a bandwidth of from approximately 0.2 Hz to approximately 3 Hz;

analyzing the low frequency signals with respect to a plurality of gesture models to detect relative eye motion between two limits of eye motion; and providing control signals to the display of the computer to control motion of the cursor in response to the plurality of gestures detected.

2. A method of controlling a device in response to biopotentials produced by an eye glance gesture made by a user comprising:

detecting biopotentials at a location on a user;

filtering the biopotentials with a low frequency bandpass filter to produce low frequency signals;

detecting the low frequency signals moving in a first direction and exceeding a first threshold;

detecting in response to the low frequency signals exceeding the first threshold, the low frequency signals moving in an opposite direction and exceeding a second threshold;

detecting in response to the low frequency signals exceeding the second threshold, the low frequency signals moving in the first direction and exceeding a third threshold; and providing a control signal identifying an eye glance gesture being made by the user in response to low frequency signals exceeding the third threshold.

3. A method of controlling a device in response to biopotentials produced by a short eye brow lift gesture made by a user comprising:

detecting biopotentials at a location on a user;

filtering the biopotentials with a high frequency bandpass filter to produce high frequency signals in a bandwidth of from approximately 70 Hz to approximately 3000 Hz;

detecting the high frequency signals moving in a first direction and exceeding a first threshold;

detecting in response to the high frequency signals exceeding the first threshold, the high frequency signals moving in an opposite direction and dropping below the first threshold;

measuring the time that the high frequency signals continuously exceed the first threshold;

measuring the time that the high frequency signals are continuously below the first threshold; and providing a control signal identifying a short eye brow lift being made by the user in response to the high frequency signals continuously exceeding the first threshold for a first period of time, and the high frequency signals being below the first threshold for a second period of time.

4. A method of controlling a cursor in a video display in response to biopotentials produced by gestures made by a user comprising:

detecting biopotentials at a location on a user;

filtering the biopotentials to produce frequency signals;

analyzing the frequency signals to provide a control signal representing a first frequency bandwidth; and initiating motion of the cursor in a first direction in response to the control signal being below a magnitude threshold for a period of time determinable by the user.

5. The method of claim 4 further comprising establishing a null amplitude representing a zero valued midpoint between negative and positive magnitude limits of the control signal determined by respective relaxed and active states of the user during a calibration process.

6. The method of claim 5 further comprising initiating motion of the cursor in response to the control signal having a magnitude below the null amplitude for a period of time determinable by the user.

7. The method of claim 6 further comprising incrementing a speed of the cursor in accordance with user determinable parameters.

8. The method of claim 7 further comprising reversing motion of the cursor in response to the control signal exceeding the magnitude threshold.

* * * * *

UNITED STATES PATENT AND TRADEMARK OFFICE
CERTIFICATE OF CORRECTION

PATENT NO. : 6,636,763 B1
DATED : October 21, 2003
INVENTOR(S) : Junker et al.

It is certified that error appears in the above-identified patent and that said Letters Patent is hereby corrected as shown below:

Column 1,
Line 12, delete "electromygraplhic ("EM G")" and insert therefor -- electromyographic ("EMG") --.
Line 19, delete "5,474,092" and insert therefor -- 5,474,082 --.
Line 23, delete "w here" and insert therefor -- where --.

Column 3,
Line 7, delete "user s" and insert therefor -- user's --.
Line 47, delete "pieces," and insert therefore -- pieces; --.

Column 4,
Line 10, delete "hitch" and insert therefor -- high --.
Line 28, delete "blinging" and insert therefor -- blinking --.
Line 42, delete "lance" and insert therefor -- glance --.

Column 8,
Line 30, delete "sampling," and insert therefor -- sampling --.
Line 51, delete "Using," and insert therefor -- Using --.

Column 10,
Line 57, delete "ma" and insert -- mag --.

Column 11,
Line 34, delete "threshold When" and insert therefor -- threshold. When --.
Line 54, delete "following, " and insert therefor -- following --.

Column 14,
Line 65, delete "Auditor" and insert therefor -- Auditory --.

Column 16,
Line 44, delete "beta," and insert therefor -- $beta_1$ --.

Column 17,
Line 1, delete "son," and insert therefor -- song --.
Line 9, delete "beta," and insert therefor -- $beta_1$ --.

UNITED STATES PATENT AND TRADEMARK OFFICE
CERTIFICATE OF CORRECTION

PATENT NO. : 6,636,763 B1
DATED : October 21, 2003
INVENTOR(S) : Junker et al.

It is certified that error appears in the above-identified patent and that said Letters Patent is hereby corrected as shown below:

<u>Column 18,</u>
Line 51, delete "crease" and insert therefor -- create --.

<u>Column 19,</u>
Line 42, delete "Applicants" and insert therefor -- Applicants' --.

Signed and Sealed this

Twenty-seventh Day of April, 2004

JON W. DUDAS
*Acting Director of the United States Patent and Trademark Office*